(12) United States Patent
Jacome

(10) Patent No.: US 11,194,471 B1
(45) Date of Patent: Dec. 7, 2021

(54) APPARATUS AND METHOD FOR DISPLAY CONTROL BASED ON TOUCH INTERFACE

(71) Applicant: Honda Motor Co., Ltd., Tokyo (JP)

(72) Inventor: Olivia M. Jacome, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/161,400

(22) Filed: Jan. 28, 2021

(51) Int. Cl.
*G06F 3/048* (2013.01)
*G06F 3/0488* (2013.01)
*G06F 3/0484* (2013.01)
*G06F 3/0354* (2013.01)

(52) U.S. Cl.
CPC ...... *G06F 3/04886* (2013.01); *G06F 3/03547* (2013.01); *G06F 3/04842* (2013.01); *G06F 3/04847* (2013.01); *G06F 2203/04803* (2013.01)

(58) Field of Classification Search
CPC ............ G06F 3/04886; G06F 3/04842; G06F 3/04847; G06F 3/03547; G06F 2203/04803
See application file for complete search history.

(56) References Cited

U.S. PATENT DOCUMENTS

| | | | |
|---|---|---|---|
| 6,874,960 B2 | 4/2005 | Daoud | |
| 7,164,410 B2 | 1/2007 | Kupka | |
| 8,078,359 B2 | 12/2011 | Small et al. | |
| 8,321,809 B2 | 11/2012 | Eom | |
| 8,352,884 B2 | 1/2013 | Zalewski et al. | |
| 9,052,810 B2 | 6/2015 | Reimann et al. | |
| 9,405,454 B2 | 8/2016 | Lee | |
| 9,898,642 B2 | 2/2018 | Han et al. | |
| 10,019,066 B2 | 7/2018 | Boblett et al. | |
| 10,082,953 B2 | 9/2018 | Grossman et al. | |
| 10,198,163 B2 | 2/2019 | Yabuki | |
| 10,379,736 B2 | 8/2019 | Miyashita | |
| 10,402,161 B2 | 9/2019 | Feit et al. | |
| 2009/0249235 A1 | 10/2009 | Kim et al. | |
| 2012/0062603 A1 | 3/2012 | Mizunuma et al. | |
| 2013/0167077 A1* | 6/2013 | Nishihashi | G06F 3/04842 715/800 |
| 2013/0187875 A1* | 7/2013 | Matsuoka | G06F 3/016 345/173 |

(Continued)

FOREIGN PATENT DOCUMENTS

KR    101354820 B1    1/2014

*Primary Examiner* — Jeanette J Parker
(74) *Attorney, Agent, or Firm* — American Honda Motor Co., Inc.; Clifford B Vaterlaus

(57) ABSTRACT

An electronic apparatus is provided. The electronic apparatus is coupled with a first user interface and a second user interface. The first user interface includes a plurality of zones to receive user inputs. The second user interface includes a plurality of sections to display a plurality of display elements. The electronic apparatus receives a first input from one of the plurality of zones, determines a first display size for at least one of the plurality of sections based on the first input, and further controls the second user interface to modify display elements of at least one of the plurality of sections, based on the first display size. The electronic apparatus further determines a first zone size for the one of the plurality of zones and controls the first user interface to modify the one of the plurality of zones, based on the first zone size.

19 Claims, 12 Drawing Sheets

(56) References Cited

U.S. PATENT DOCUMENTS

2015/0095828 A1* 4/2015 Iida .................... G06F 3/04842
 715/771
2017/0371515 A1* 12/2017 Feit ...................... G06F 3/0488
2019/0310771 A1 10/2019 Miyashita

* cited by examiner

APPARATUS AND METHOD FOR DISPLAY CONTROL BASED ON TOUCH INTERFACE

BACKGROUND

Recent advancements in the field of automotive have led to development of various technologies for user interfaces to control a vehicle. Generally, the user interface may include a touch interface to control a display screen. For example, a vehicular system may include a touchpad to control a display screen of an infotainment system that is coupled to the vehicular system. The touchpad includes a plurality of zones, which may receive user input to control the display screen of the infotainment system. In certain situations, the touchpad may be of small dimensions due to which the control of display elements on the display screen may be cumbersome for an occupant (such as driver) of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic apparatus is provided. The electronic apparatus may include circuitry that may be communicably coupled with a first user interface and a second user interface. The first user interface may include a plurality of zones having a plurality of input areas to receive user inputs. The second user interface may include a plurality of sections to display a plurality of display elements. The circuitry may receive a first input from an input area of one of the plurality of zones of the first user interface. The circuitry may further determine a first display size for at least one of the plurality of sections of the second user interface based on the received first input. At least one of the plurality of sections may correspond to the one of the plurality of zones of the first user interface from which the first input is received. The circuitry may further control the second user interface to modify at least one display element of at least one of the plurality of sections, based on the determined first display size. The circuitry may further determine a first zone size for the one of the plurality of zones of the first user interface from which the first input is received, based on the determined first display size for at least one of the plurality of sections of the second user interface. The circuitry may further control the first user interface to modify the input area of the one of the plurality of zones, based on the determined first zone size.

According to another embodiment of the disclosure, a method is provided. The method may be performed in an electronic apparatus that may be coupled with a first user interface and a second user interface. The first user interface may include a plurality of zones having a plurality of input areas to receive user inputs. The second user interface may include a plurality of sections to display a plurality of display elements. The method may include receiving a first input from an input area of one of the plurality of zones of the first user interface. The method may further include determining a first display size for at least one of the plurality of sections of the second user interface based on the received first input. At least one of the plurality of sections may correspond to the one of the plurality of zones of the first user interface from which the first input is received. The method may further include controlling the second user interface to modify at least one display element of at least one of the plurality of sections, based on the determined first display size. The method may further include determining a first zone size for the one of the plurality of zones of the first user interface from which the first input is received, based on the determined first display size for at least one of the plurality of sections of the second user interface. The method may further include controlling the first user interface to modify the input area of the one of the plurality of zones, based on the determined first zone size.

According to another embodiment of the disclosure, a system is provided. The system may include circuitry communicably coupled with a first user interface and a second user interface. The first user interface may include a plurality of zones having a plurality of input areas to receive user inputs. The second user interface may include a plurality of sections to display a plurality of display elements. The circuitry may receive a first input from an input area of one of the plurality of zones of the first user interface. The circuitry may further determine a first display size for at least one of the plurality of sections of the second user interface based on the received first input. At least one of the plurality of sections may correspond to the one of the plurality of zones of the first user interface from which the first input is received. The circuitry may further control the second user interface to modify at least one display element of at least one of the plurality of sections, based on the determined first display size. The circuitry may further determine a first zone size for the one of the plurality of zones of the first user interface from which the first input is received, based on the determined first display size for at least one of the plurality of sections of the second user interface. The circuitry may further control the first user interface to modify the input area of the one of the plurality of zones, based on the determined first zone size.

According to another embodiment of the disclosure, a non-transitory computer-readable medium is provided. The non-transitory computer-readable medium may store thereon, computer-executable instructions which, when executed by an electronic apparatus, cause the electronic apparatus to execute operations. The operations may include controlling a first user interface including a plurality of zones having a plurality of input areas to receive user inputs. The operations may further include controlling a second user interface including a plurality of sections to display a plurality of display elements. The operations may further include receiving a first input from an input area of one of the plurality of zones of the first user interface. The operations may further include determining a first display size for at least one of the plurality of sections of the second user interface based on the received first input. At least one of the plurality of sections may correspond to the one of the plurality of zones of the first user interface from which the first input is received. The operations may further include controlling the second user interface to modify at least one display element of at least one of the plurality of sections, based on the determined first display size. The operations may further include determining a first zone size for the one of the plurality of zones of the first user interface from which the first input is received, based on the determined first display size for at least one of the plurality of sections of the second user interface. The operations may further include controlling the first user interface to modify the input area of the one of the plurality of zones, based on the determined first zone size.

Figure 1:
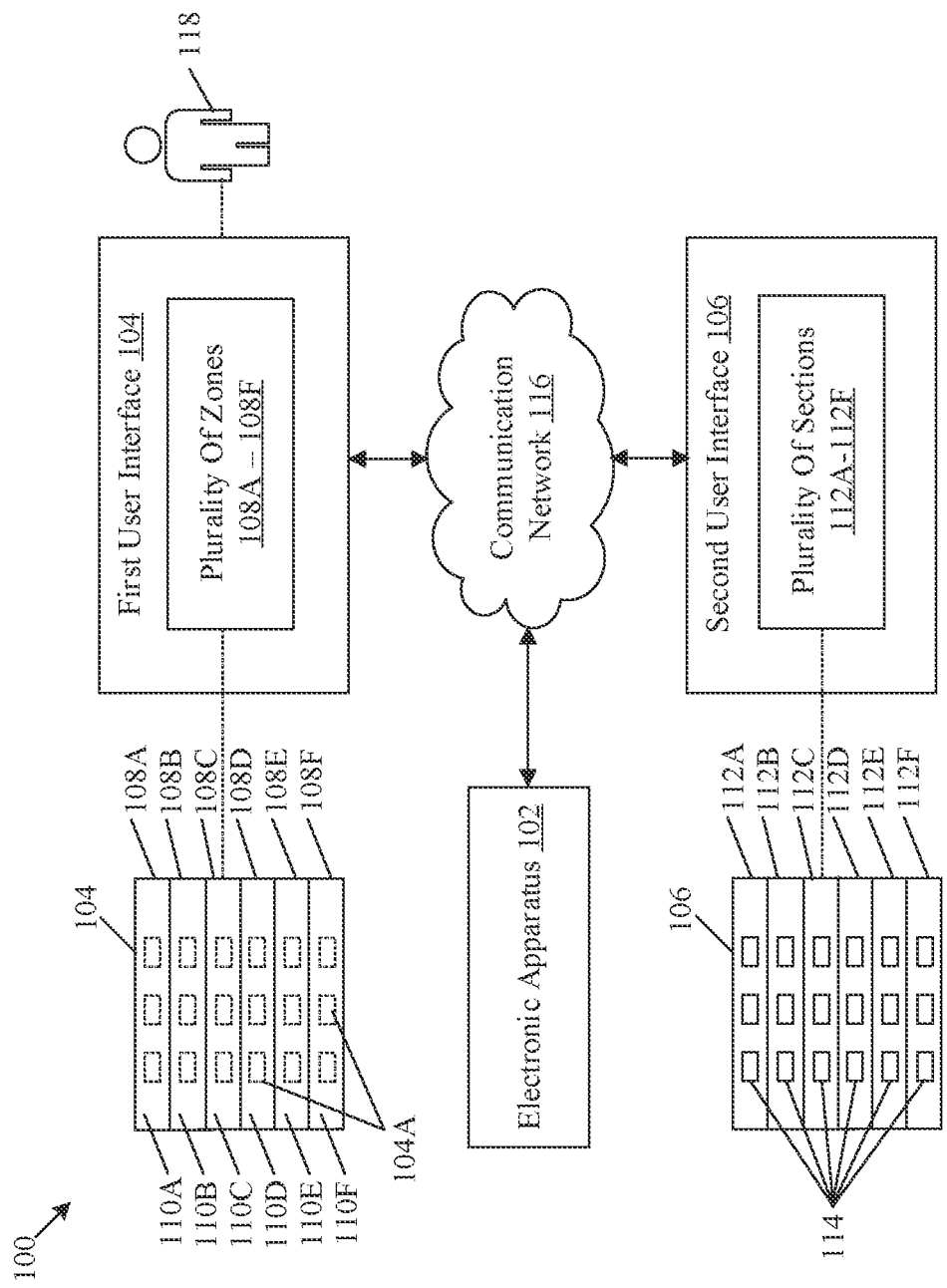
FIG. 1 is a block diagram that illustrates an exemplary network environment for display control by an electronic apparatus based on touch interface, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic apparatus that may be coupled with a touch interface for display control. Exemplary aspects of the disclosure may provide an electronic apparatus (such as an electronic control device of a vehicle, an in-vehicle infotainment system, and the like) that may be coupled with a first user interface (such as a touch pad) and a second user interface (such as a display screen) in the vehicle. The first user interface may include a plurality of zones (such as a plurality of touch zones) that may be configured to receive user inputs from an occupant of the vehicle. The second user interface may include a plurality of sections (such as display sections) that may be configured to display a plurality of display elements (such as a textual character, a graphical icon, and the like).

The electronic apparatus may be configured to receive a first input (such as a touch input or a hover input) from an input area (such as a touch area) of one of the plurality zones (such as one of the touch zones) of the first user interface (i.e. touch pad). Based on the received first input, the electronic apparatus may determine a first display size (such as a text size, graphic size, and the like) for at least one of the plurality of sections of the second user interface, where the one section may correspond to the one zone of the first user interface from which the first input is received. Based on the determined first display size, the electronic apparatus may control the second user interface to modify at least one display element of at least one of the plurality of sections. For example, the electronic apparatus may control the second user interface (i.e. display screen) to enlarge the first display size of at least one display element, such that, it may be easier for the occupant to clearly view a selected display element from the plurality of sections of the second interface.

Based on the determined first display size, the electronic apparatus may be further configured to determine a first zone size (such as a touch zone size) for the one of the plurality of zones of the first user interface from which the first input is received. Based on the determined first zone size, the electronic apparatus may control the first user interface to modify the input area of the one of the plurality of zones. For example, the electronic apparatus may control the first user interface to enlarge a zone size (such as a touch zone size) of the one of the plurality of zones from which the first input is received, such that, it may be easier for the occupant to provide inputs from each zone of the plurality of zones of the first user interface. Additionally, the enlarged zone size may also prevent unintended user inputs from zones other than the one of the plurality of zones of the first user interface. For example, in case of the enlarged zone size, the user inputs received on one zone may not interfere with other zones of the plurality of zones of the first user interface (i.e. touchpad).

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for display control by an electronic apparatus based on touch interface, in accordance with an embodiment of the disclosure. There is shown a network environment 100 which may include an electronic apparatus 102. The electronic apparatus 102 may be communicatively coupled with a first user interface 104 and a second user interface 106. The first user interface 104 may include a plurality of zones 108A-108F with a plurality of input areas 110A-110F to receive user inputs. Each of the plurality of zones 108A-108F may further include a plurality of sub-zones 104A, as shown in FIG. 1. The second user interface 106 may include a plurality of sections 112A-112F to display a plurality of display elements 114. The electronic apparatus 102 may include a communication network 116 that may be communicably coupled between the first user interface 104 and the second user interface 106. The electronic apparatus 102 may be configured to control the first user interface 104 to receive user inputs for display control of the second user interface 106. The user inputs may be provided by a user 118.

The electronic apparatus 102 may include suitable logic, circuitry, interfaces and/or code that may be configured to control the first user interface 104 to receive user inputs from the plurality of zones 108A-108F of the first user interface 104. The electronic apparatus 102 may be further configured to control the second user interface 106 to control display elements of the plurality of sections 112A-112F of the second user interface 106, based on the received user inputs. The electronic apparatus 102 may be configured to determine a first display size and a first zone size for one of the plurality of sections 112A-112F and for one of the plurality of zones 108A-108F, respectively. The electronic apparatus 102 may further modify the size of the one of the plurality of sections 112A-112F of the second user interface 106 and the size of the one of the plurality of zones 108A-108F of the first user interface 104, based on the determined first display size and the first zone size, respectively. Examples of the electronic apparatus 102 may include, but are not limited to, an electronic control device, an in-vehicle infotainment system, a vehicle control device, a computing device, a navigation system, an automotive dashboard, a human-machine interface, a mobile phone, a computer workstation, a server, and the like.

In one embodiment, the electronic apparatus 102 may be the electronic control device that may include suitable logic, circuitry, interfaces, and/or code that may be configured to control the first user interface 104 and the second user interface 106. The electronic control device may be a specialized electronic circuitry that may include an electronic control unit (ECU) processor to control different functions, such as, but not limited to, display control, engine operations, communication operations, and data acquisition of the vehicle. For example, the electronic control device may be a microprocessor. Other examples of the electronic control device may include, but are not limited to, a vehicle control system, an embedded device, and the like. In one embodiment, the electronic control device may be included or integrated in the vehicle.

In other embodiment, the electronic apparatus 102 may be the in-vehicle infotainment system, which may include suitable logic, circuitry, interfaces and/or code that may be configured to present at least an audio-based data, a video-based data and a user interface of the vehicle. Examples of the in-vehicle infotainment system may include, but are not limited, an in-car entertainment (ICE) system, an automotive Head-up Display (HUD), an automotive dashboard. a human-machine interface (HMI), an entertainment system, a navigation system, a vehicle user interface (UI) system, an Internet-enabled communication system, and other entertainment systems.

In yet another embodiment, the electronic apparatus 102 may be the computing device or control device that may include suitable logic, circuitry, interfaces, and/or code that may be configured to control the first user interface 104 (such as a touch pad) and the second user interface 106 (such as a display screen). Examples of the computing device may include, but not limited to, a computer workstation, a consumer electronic (CE) device (such as a television, stereo systems and the like), a home appliance (such as a washing machine, a refrigerator, and the like), a server, a microprocessor, a central processing unit (CPU), a processor, and other computing devices.

The first user interface 104 may include suitable logic, circuitry, and interfaces that may be configured to receive the user inputs. The first user interface 104 may be a touch pad, which may be configured to receive the user inputs via the plurality of input areas 110A-110F associated with the plurality of zones 108A-108F of the first user interface 104. For example, the first user interface 104 (such as the touch pad) may be coupled with the in-vehicle infotainment system (i.e. electronic apparatus 102) of the vehicle (shown in FIG. 3) to receive user inputs. Examples of the first user interface 104 may include, but not limited to, a resistive touch pad, a capacitive touchpad, a conductive touchpad, a tactile pad, a wireless touchpad, and the like. In an embodiment, the electronic apparatus 102 may control the first user interface 104 to configure the plurality of input areas 110A-110F associated with the plurality of zones 108A-108F to selectively receive the user inputs.

The plurality of zones 108A-108F of the first user interface 104 may be a plurality of distinct touch zones in the first user interface 104 that may be configured to form a selective boundary for the user 118 to provide selective user inputs. The selective boundary of the plurality of zones 108A-108F may include a horizontal limit and a vertical limit for each zone of the plurality of zones 108A-108F that may be configured to distinctly receive user inputs through the plurality of input areas 110A-110F (i.e. touch areas) associated with the plurality of zones 108A-108F of the first user interface 104. Each of the plurality of zones 108A-108F may further include a plurality of sub-zones 104A, as shown in FIG. 1.

The plurality of sub-zones 104A of each of the plurality of zones 108A-108F of the first user interface 104 may correspond to the plurality of display elements 114 of each of the plurality of sections 112A-112F of the second user interface 106. For example, a number of plurality of sub-zones 104A of each of the plurality of zones 108A-108F of the first user interface 104 may be same as a number of the plurality of display elements 114 of each of the plurality of sections 112A-112F of the second user interface 106. In another example, each of the plurality of sub-zones 104A of each of the plurality of zones 108A-108F of the first user interface 104 may be mapped one-to-one (such as absolute referencing) with each of the plurality of display elements 114 of each of the plurality of sections 112A-112F of the second user interface 106.

In an embodiment, the plurality of sub-zones 104A may be configured to form a sub-boundary for the user 118 to provide selective user inputs. The sub-boundary of the plurality of sub-zones 104A may include a horizontal limit and a vertical limit for each sub-zone of the plurality of sub-zones 104A that may be configured to distinctly receive user inputs. Based on the received user inputs form the plurality of sub-zones 104A of the first user interface 104, the plurality of display elements 114 of the second user interface 106 may be modified, as further explained.

The second user interface 106 may include suitable logic, circuitry, and interfaces that may be configured to display the plurality of display elements 114 to the user 118. For example, the second user interface 106 (such as the display screen) may be coupled with the in-vehicle infotainment system (i.e. electronic apparatus 102) of the vehicle to display the plurality of display elements 114 based on the received user inputs. Examples of the second user interface 106 may include, but not limited to, at least one of a Liquid Crystal Display (LCD) display, a Light Emitting Diode (LED) display, a plasma display, or an Organic LED (OLED) display technology, or other display devices. In accordance with an embodiment, the second user interface 106 may refer to a display screen of a head mounted device (HMD), a smart-glass device, a see-through display, a projection-based display, an electro-chromic display, or a transparent display. The second user interface 106 may include the plurality of sections 112A-112F to selectively display the plurality of display elements 114.

The plurality of sections 112A-112F of the second user interface 106 may be a plurality of distinct display sections in the second user interface 106 that may be configured to selectively form a boundary to display the plurality of display elements 114 for the user 118. The boundary formed by the plurality of sections 112A-112F may include a horizontal limit and a vertical limit for each section of the plurality of sections 112A-112F that may be configured to distinctly display the plurality of display elements 114 associated with the plurality of sections 112A-112F of the second user interface 106.

The plurality of display elements 114 may be configured to display information for the user 118 via the second user interface 106. In an embodiment, the plurality of display elements 114 may correspond to at least one of: a textual character, a graphical icon, or an image. For example, the plurality of display elements 114 may be a plurality of characters of a virtual keyboard that may be displayed on the second user interface 106. In another example, the plurality of display elements 114 may be a plurality of display icons (such as navigation or user interface buttons) of the in-vehicle infotainment system. In another example, the plurality of display elements 114 may be a plurality of images displayed on the plurality of sections 112A-112F of the second user interface 106. In an embodiment, the electronic apparatus 102 may control the second user interface 106 to modify the plurality of display elements 114 based on the user inputs that may be received from the first user interface 104 via the communication network 116.

The communication network 116 may include a communication medium through which the electronic apparatus 102, the first user interface 104, and the second user interface 106 may communicate with each other. The communication network 116 may be one of a wired connection or a wireless connection. Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In some embodiments, the communication network 116 may include an in-vehicle network that may include a medium through which the various control units, components, and/or systems (for example the electronic apparatus 102, the first user interface 104, and the second user interface 106) of the vehicle may communicate with each other. In accordance with an embodiment, in-vehicle communication of audio/video data may occur by use of Media Oriented Systems Transport (MOST) multimedia network protocol of the in-vehicle network or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle. The in-vehicle network may facilitate access control and/or communication between control circuitry and other ECUs, such as ECM or a telematics control unit (TCU) of the vehicle.

In an embodiment, the first user interface 104 may be different from the second user interface 106, and the electronic apparatus 102 may be configured to communicate between the first user interface 104 and the second user interface 106 via the communication network 116. For example, in some cases, the first user interface 104 (such as the touch pad) may be separately coupled with the second user interface 106 (such as the display screen of the in-vehicle infotainment system). In such cases, the electronic apparatus 102 may interact with the communication network 116 to communicate between (or control) the first user interface 104 and the second user interface 106. In an embodiment, each of the plurality of zones 108A-108F of the first user interface 104 may correspond to at least one section of the plurality of sections 112A-112F of the second user interface 106. For example, each of the plurality of zones 108A-108F of the first user interface 104 (such as the touchpad) may be mapped (such as absolute referencing) to at least one section of the plurality of sections 112A-112F of the second user interface 106 (such as the display screen of the in-vehicle infotainment system). For example, with respect to FIG. 1, a zone 108A of the first user interface 104 may correspond to or mapped with a section 112A of the second user interface 106.

Figure 4:
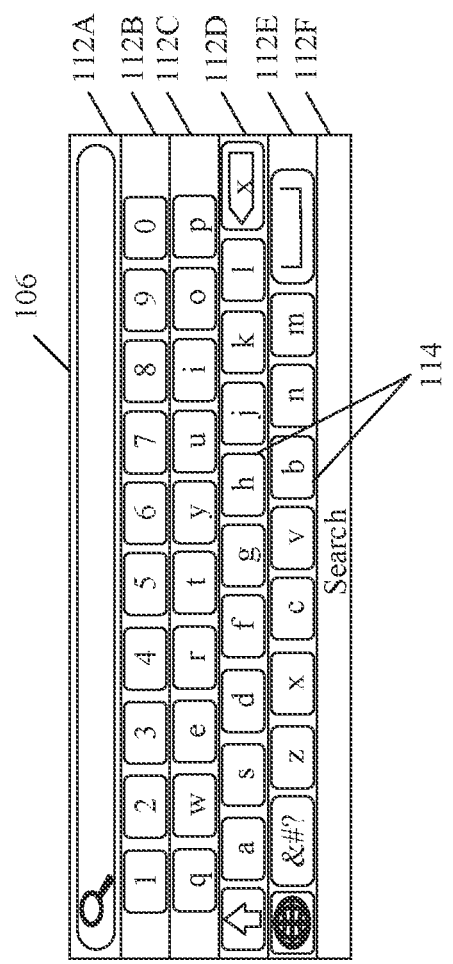
FIG. 4 is a diagram that illustrates an exemplary structure of a first user interface and a second user interface coupled with the electronic apparatus of FIG. 1 for display control, in accordance with an embodiment of the disclosure.
Figure 4:
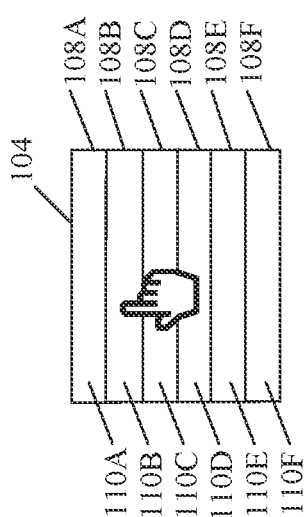
Figure 5A:
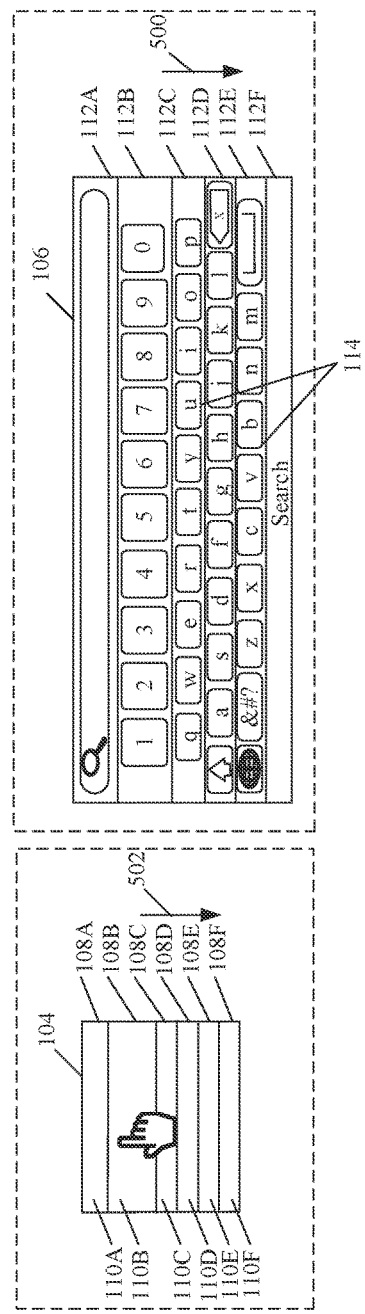
FIGS. 5A-5B are diagrams that collectively illustrate a first exemplary scenario for display control of the second user interface based on inputs received on the first user interface coupled with the electronic apparatus of FIG. 1, in accordance with an embodiment of the disclosure.

In operation, the electronic apparatus 102 may be configured to receive a first input (such as a tactile input from the user 118) from an input area (for example, input area 110B as shown in FIG. 5A) of one of the plurality of zones 108A-108F of the first user interface 104. The electronic apparatus 102 may further configured to determine a first display size (such as the text size, graphic size, and the like) for at least one of the plurality of sections 112A-112F of the second user interface 106 based on the received first input. At least one of the plurality of sections 112A-112F may correspond to the one of the plurality of zones 108A-108F of the first user interface 104 from which the first input is received. The first user interface 104, the second user interface 106, receipt of the first input and the determination of the first display size are described, for example, in FIGS. 3, 4, and 5A. The electronic apparatus 102 may be further configured to control the second user interface 106 to modify at least one display element (as described in FIGS. 5A-5B) of at least one of the plurality of sections 112A-112F, based on the determined first display size. For example, the electronic apparatus 102 may control the second user interface 106 to enlarge the first display size of at least one display element (as described in FIGS. 5A-5B) from the plurality of sections 112A-112F, so that it may be easier for the user 118 to clearly view a selected display element out of other display elements on the plurality of sections 112A-112F of the second user interface 106.

Figure 5B:
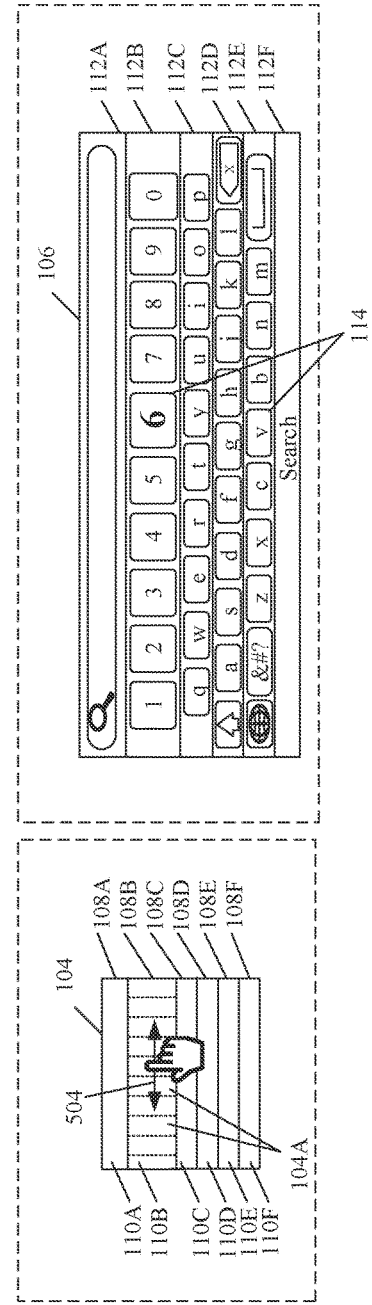

Based on the determined first display size for at least one of the plurality of sections 112A-112F of the second user interface 106, the electronic apparatus 102 may be further configured to determine a first zone size (such as zone 108B, as shown in FIG. 5A) for the one of the plurality of zones 108A-108F of the first user interface 104 from which the first input is received. In an example, in case the first display size is determined for a section (such as a section 112B as shown in FIG. 5A) from the plurality of sections 112A-112F, then the electronic apparatus 102 may determine the first zone size for a corresponding zone (such as the zone 108B as shown in FIG. 5A) from the plurality of zones 108A-108F. In another example, in case the first display size is determined for a section (such as a section 112B as shown in FIG. 5A) from the plurality of sections 112A-112F, then the electronic apparatus 102 may determine a sub-zone size for the plurality of sub-zones 104A of a corresponding zone (such as the zone 108B as shown in FIG. 5B) from the plurality of zones 108A-108F. In yet another example, in case the first display size is determined for a section (such as a section 112B as shown in FIG. 5A) from the plurality of sections 112A-112F, then the electronic apparatus 102 may determine the first zone size for a corresponding zone (such as the zone 108B as shown in FIG. 5A) from the plurality of zones 108A-108, and further determine the sub-zone size for the plurality of sub-zones 104A of the corresponding zone (such as the zone 108B as shown in FIG. 5B) from the plurality of zones 108A-108F. The determination of the first zone size and the sub-zone size are further described, for example, in FIGS. 5A-5B. The electronic apparatus 102 may be further configured to control the first user interface 104 to modify the input area (for example, input area 110B of the one of the plurality of zones 108A-108F, based on the determined first zone size. For example, the electronic apparatus 102 may control the first user interface 104 to enlarge a zone size (such as zone 108B, as shown in FIG. 5A) of the one of the plurality of zones 108A-108F from which the first input is received, so that it may be easier for the user 118 to provide touch inputs from each zone of the plurality of zones 108A-108F of the first user interface 104. Further, it may also be easier for the user 118 to navigate in the enlarged zone size (such as at the zone 108B shown in FIG. 5B) within the plurality of sub-zones 104A of the selected zone (such as the zone 108B) of the first user interface 104. Additionally, the enlarged zone size of the selected zone (i.e. zone 108B) may also prevent unintended user inputs from other nearby zones (such as the zone 108A and zone 108C). For example, in case of enlarged zone size, the user inputs provided on selected zone (such as at enlarged zone 108B shown) may not interfere with other zones of the plurality of zones 108A-108F of the first user interface 104 and/or also the user inputs received on other nearby zones (such as the zone 108A and zone 108C) may not interfere accidently on the selected zone (such as the zone 108B). Details on the enlarged zone size are further described, for example in FIGS. 5A and 5B.

Figure 2:
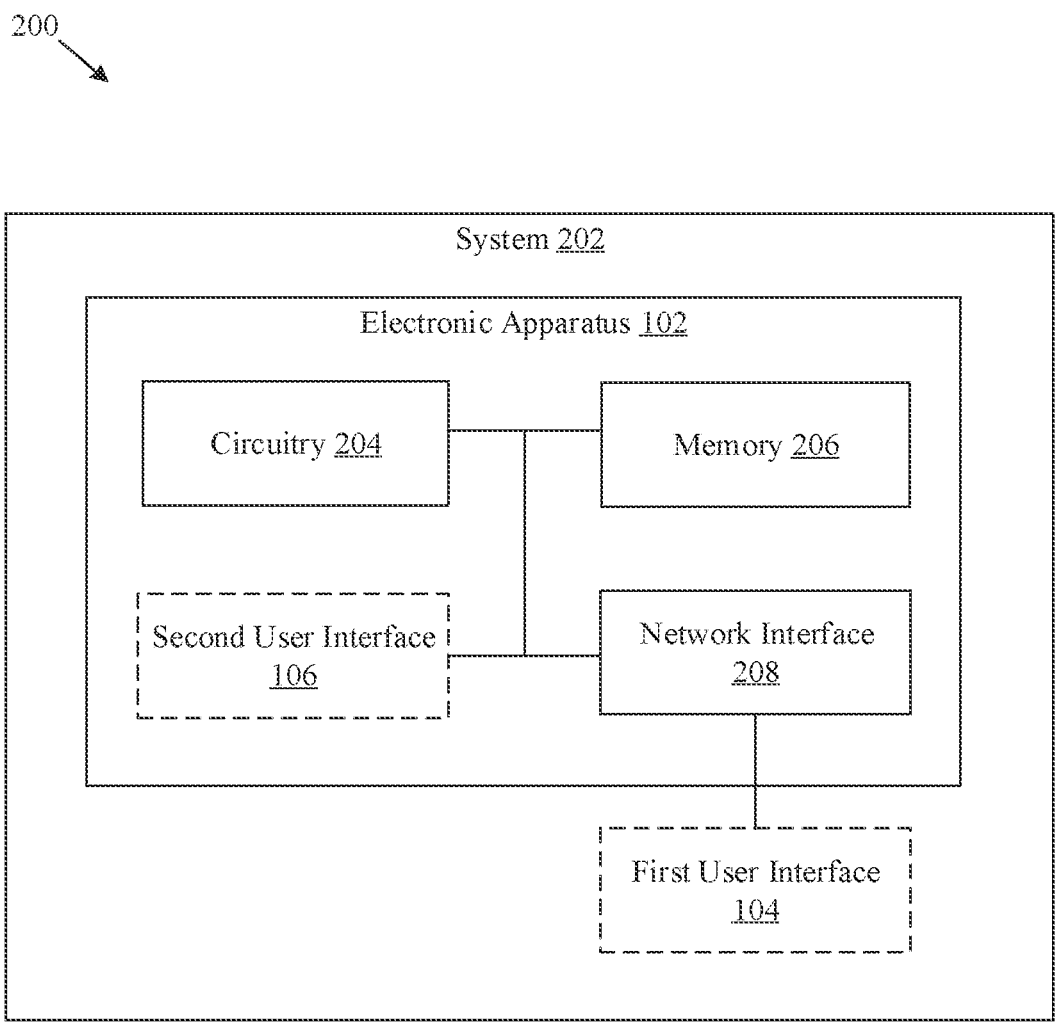
FIG. 2 is a block diagram that illustrates an exemplary system including an electronic apparatus coupled with a first user interface for display control, in accordance with an embodiment of the disclosure.

FIG. 2 is a block diagram that illustrates an exemplary system including an electronic apparatus coupled with a first user interface for display control, in accordance with an embodiment of the disclosure. FIG. 2 is explained in conjunction with elements from FIG. 1. With reference to FIG. 2, there is shown a block diagram 200 of a system 202. The system 202 may include the electronic apparatus 102 and the first user interface 104. The electronic apparatus 102 may include circuitry 204, a memory 206, and a network interface 208. The first user interface 104 may be communicably coupled to the electronic apparatus 102 included in the system 202. In some embodiments, the electronic apparatus 102 may include the second user interface 106 as shown in FIG. 2, where the second user interface 106 is integrated in the electronic apparatus 102.

In an embodiment, the system 202 (such as the vehicle or any electrical or electronic machine which may include the electronic apparatus 102) may control the first user interface 104 (such as the touch pad) to receive user inputs for display control of the second user interface 106 (such as the display screen) associated with the electronic apparatus 102 (such as the in-vehicle infotainment system). In another embodiment, the electronic apparatus 102 (such as the in-vehicle infotainment system) may control the first user interface 104 (such as the touchpad) associated with (or included in) the system 202 to control the second user interface 106 (such as the display screen) associated with the electronic apparatus 102.

The circuitry 204 may include suitable logic, circuitry, and/or interfaces that may be configured to execute program instructions associated with different operations to be executed by the electronic apparatus 102. For example, some of the operations may include, but are not limited to, reception of the first input from the input area (such as input area 110B as shown in FIG. 5A) of one of the plurality of zones 108A-108F of the first user interface 104, determination of the first display size for at least the one of the plurality of sections 112A-112F of the second user interface 106 based on the received first input, control of the second user interface 106 to modify at least one display element of at least one of the plurality of sections 112A-112F based on the determined first display size, determination of the first zone size for the one of the plurality of zones 108A-108F of the first user interface 104 from which the first input is received, based on the determined first display size, and control of the first user interface 104 to modify the input area (such as the input area 110B as shown in FIG. 5B) of the one of the plurality of zones 108A-108F, based on the determined first zone size. The operations may further control the first user interface 104 to modify a sub-zone area of the plurality of sub-zones 104A based on a sub-zone size. The circuitry 204 may be communicably coupled with the first user interface 104 and the second user interface 106. The execution of such operations is further explained, for example, in FIGS. 5A-5B.

The circuitry 204 may include any suitable special-purpose or general-purpose computer, computing entity, or processing device including various computer hardware or software modules and may be configured to execute instructions stored on any applicable computer-readable storage media (for example the memory 206). The circuitry 204 may be implemented based on a number of processor technologies known in the art. For example, the circuitry 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 204 may include any number of processors configured to, individually or collectively, perform any number of operations of the electronic apparatus 102, as described in the present disclosure. Examples of the circuitry 204 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 206 may include suitable logic, circuitry, interfaces, and/or code that may be configured to store the set of instructions executable by the circuitry 204. The memory 206 may be configured to store information associated with correspondence between the plurality of zones 108A-108F of the first user interface 104 and the plurality of sections 112A-112F of the second user interface 106. For example, the memory 206 may be configured to store mapping information (such as absolute referencing between the plurality of zones 108A-108F and the plurality of sections 112A-112F. The memory 206 may be further configured to store the first display size determined by the circuitry 204 for the plurality of sections 112A-112F. The memory 206 may be further configured to store the first zone size determined by the circuitry 204 for the plurality of zones 108A-108F. Details of the first display size and the first zone size are further described, for example in FIGS. 5A and 5B. The memory 206 may be further configured to store control instructions associated with a selection of at least one display element from the plurality of display elements 114. The control instructions are further described, for example in FIGS. 5A-5B. Examples of implementation of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The network interface 208 may include suitable logic, circuitry, and interfaces that may be configured to facilitate communication between the circuitry 204, the first user interface 104, and the second user interface 106, via the communication network 116. The network interface 208 may be implemented by use of various known technologies to support wired or wireless communication of the electronic apparatus 102 with the communication network 116. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

In an embodiment, the electronic apparatus 102 may include both the first user interface 104 and the second user interface 106. For example, the electronic apparatus 102 may be implemented as a portable mobile device that may include both the first user interface 104 and the second user interface 106. Examples of the portable mobile device may include, but are not limited to, a portable or handheld computing device, a smartphone, a cellular phone, a mobile phone, or a gaming device, and/or a consumer electronic (CE) device.

In another embodiment, the system 202 may include both the first user interface 104 and the second user interface 106 and the electronic apparatus 102 may be communicably coupled to the first user interface 104 and the second user interface 106 of the system 202, via the communication network 116. In such embodiment, the electronic apparatus 102 may be a cloud server, which may be utilized to execute various operations through web applications, cloud applications, HTTP requests, repository operations, file transfer, and the like. Examples of the electronic apparatus 102 may include, but are not limited to, an event server, a database server, a file server, a web server, a media server, a content server, an application server, a mainframe server, or a combination thereof. In one or more embodiments, the electronic apparatus 102 may be implemented as a plurality of distributed cloud-based resources.

Although in FIG. 2, it is shown that the system 202 includes the electronic apparatus 102 and the first user interface 104, the disclosure may not be limiting and the system 202 may include more or less components to perform the same or other functions of the system 202. Details of the other functions and the components have been omitted from the disclosure for the sake of brevity. Further, although in FIG. 2, it is shown that the electronic apparatus 102 includes the circuitry 204, the memory 206, and the network interface 208, the disclosure may not be limiting and the electronic apparatus 102 may include more or less components to perform the same or other functions of the electronic apparatus 102. Details of the other functions and the components have been omitted from the disclosure for the sake of brevity. The functions or operations executed by the electronic apparatus 102, as described in FIG. 1, may be performed by the circuitry 204 in FIG. 2 for display control based on the user inputs received from the first user interface 104. The exemplary scenario for such display control is further explained, for example, in FIGS. 3, 4, 5A-5B, 6A-6B, and 7A-7B.

Figure 3:
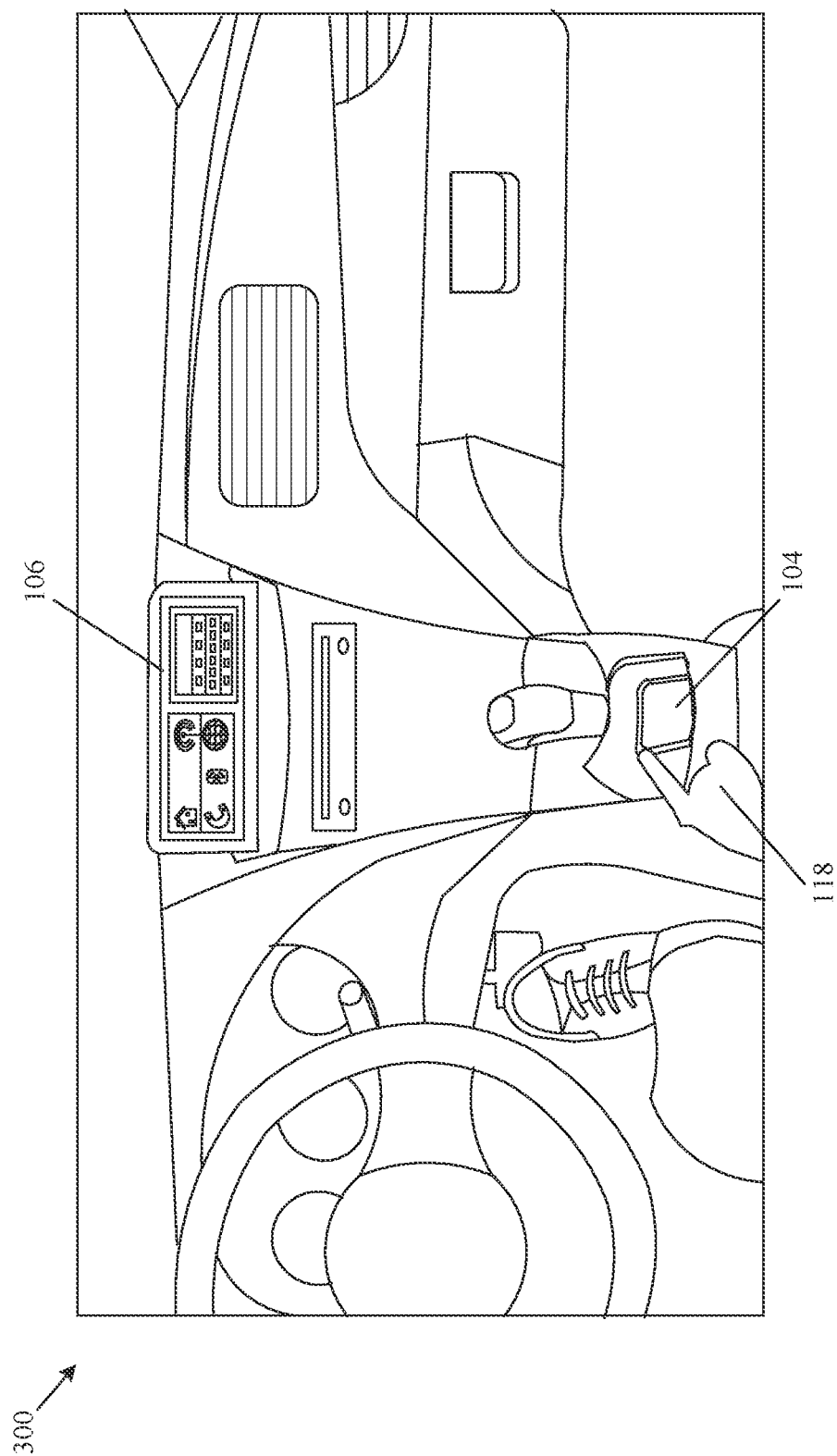
FIG. 3 is a diagram that illustrates an exemplary arrangement of a first user interface and a second user interface coupled with the electronic apparatus of FIG. 1 for display control in a vehicle, in accordance with an embodiment of the disclosure.

FIG. 3 is a diagram that illustrates an exemplary arrangement of a first user interface and a second user interface coupled with the electronic apparatus of FIG. 1 for display control in a vehicle, in accordance with an embodiment of the disclosure. FIG. 3 is explained in conjunction with elements from FIG. 1 and FIG. 2. With reference to FIG. 3, there is shown an exemplary vehicle 300 that may include the first user interface 104 and the second user interface 106. The first user interface 104 may be the touchpad associated with the exemplary vehicle 300. The second user interface 106 may be the display screen of the in-vehicle infotainment system associated with the exemplary vehicle 300, as shown for example in FIG. 3.

In an embodiment, the first user interface 104 may be disposed in a first plane adjacent to a hand of the user 118 (for example a driver or passenger of the vehicle 300) so that it may be easier for the user 118 to provide the user inputs via the first user interface 104 to control the second user interface 106. The second user interface 106 may be disposed in a second plane that may be different from the first plane. The electronic apparatus 102 may be configured to control display of the second user interface 106 based on the received user inputs from the first user interface 104. It may be noted here that the positions, arrangements, shapes, or structure of the first user interface 104 and the second user interface 106 shown in FIG. 3 is merely an example. The present disclosure may be also applicable to other positions, arrangements, shapes, or structure of the first user interface 104 and the second user interface 106, without a deviation from scope of the disclosure. As shown in FIG. 3, the first user interface 104 and the second user interface 106 are shown separated with each other. In some other embodiments, the first user interface 104 and the second user interface 106 may be integrated into each other.

FIG. 4 is a diagram that illustrates an exemplary structure of a first user interface and a second user interface coupled with the electronic apparatus of FIG. 1 for display control, in accordance with an embodiment of the disclosure. FIG. 4 is explained in conjunction with elements from FIG. 1, FIG. 2, and FIG. 3. With reference to FIG. 4, there is shown the first user interface 104 and the second user interface 106. The first user interface 104 may be the touchpad that may include the plurality of zones 108A-108F. The plurality of zones 108A-108F may have the plurality of input areas 110A-110F that may be configured to receive the user inputs from the user 118. The second user interface 106 may be the display screen that may include the plurality of sections 112A-112F as shown in FIG. 4. The plurality of sections 112A-112F may be configured to display the plurality of display elements 114 to the user 118 (not shown in FIG. 4). In an embodiment, the plurality of display elements 114 may correspond to at least one of: the textual character, the graphical icon, or the image. In another embodiment, the plurality of display elements 114 may correspond to a user interactable element such as, but is not limited to, a UI button, a slider, a UI checkbox, or a UI textbox. For example, the plurality of display elements 114 on the plurality of sections 112A-112F may represent a virtual keyboard that may be displayed to the user 118, as shown in FIG. 4. The virtual keyboard may have a QWERTY keyboard layout or any other keyboard layout such as AZERTY, QWERTZ, JCUKEN, Dvorak, Colemak, Maltron, and the like. In another example, the plurality of display elements 114 on the plurality of sections 112A-112F may include a plurality of graphical or UI icons to control different operations of the second user interface 106 or the electronic apparatus 102.

In accordance with an embodiment, a number of sections of the plurality of sections 112A-112F on the second user interface 106 may depend on grouping of the plurality of display elements 114 to be displayed or currently displayed on the second user interface 106. The circuitry 204 of the electronic apparatus 102 or the second user interface 106 may group the plurality of display elements 114 based on total number of the plurality of display elements 114. For examples, there are "41" textual character icons (as the plurality of display elements 114) included in the QWERTY keyboard layout shown in FIG. 4. Thus, the second user interface 106 may group the plurality of display elements 114 into four groups based on different factors such as dimension of each icon, and the display size of the second user interface 106. In such case, there may be four sections (such as section 112B, section 112C, section 112D, and section 112E shown in FIG. 4) which may be equal to the number of groups formed based on the number of the textual character icons shown in FIG. 4. In some embodiments, the number of groups may be formed based on display layout of the plurality of display elements 114 or based on predefined display size of one or more display elements. For example, as shown in FIG. 4, the predefined display size for the "Search" display element is higher in the complete QWERTY keyboard layout, and a specific group and a section (such as section 112F) is assigned to the "Search" display element of the plurality of sections 112A-112F of the second user interface 106. In some embodiments, the groups of the plurality of display elements 114 are formed based on equal division of the plurality of display elements 114 and dimension of each display element and the display size of the second user interface 106. For example, if there are total 20 display elements (such as the 20 user interactable images to be rendered), then the second user interface 106 may form four groups, with each group equally includes five images. Therefore, the second user interface 106 may form five sections of the plurality of sections 112A-112F based on the number of groups formed from the plurality of display elements 114. In accordance with an embodiment, the circuitry 204 of the electronic apparatus 102 may form same number of zones in the first user interface 104 as number of sections formed in the plurality of sections 112A-112F of the second user interface 106. For example, as shown in FIG. 4, for six sections (sections 112A-112F) in the second user interface 106, six corresponding zones (zones 108A-108F) may be assigned in the first user interface 104. Further, based on the number of plurality of display elements 114 on different sections (such as section 112B, section 112C, section 112D, and section 112E), a plurality of sub-zones may be formed on corresponding zones on the first user interface 104, as described and/or shown, for example, in FIGS. 1 and 5A-5B.

It may be noted that six number of sections (i.e. plurality of sections 112A-112F) on the second user interface 106, and six number of zones (i.e. plurality of zones 108A-108F) on the first user interface 104 shown in FIGS. 1, 4, 5A-5B, 6A-6B, and 7A-7B is merely presented as an example. There may be more or less number of sections on the second user interface 106 and number of zones on the first user interface 104 based on the number of groups formed for the plurality of display elements 114, without a deviation from scope of the disclosure.

In an embodiment, the first user interface 104 may have a particular shape (i.e. substantially rectangular shape) and may have a first aspect ratio (i.e. ratio of dimensions of longer side to shorter side). Similarly, the second user interface 106 may also have a particular shape (such as substantially rectangular shape and may have a second aspect ratio. In one embodiment, the first aspect ratio of the first user interface 104 is same as the second aspect ratio of the second user interface 106. For example, although the first user interface 104 and the second user interface 106 may have a different dimensional configurations (such as a change in size of length, width, and breadth), the first user interface 104 and the second user interface 106 may have the same aspect ratio (such as but is not limited to, "4:3", "5:4", "16:9", 16:10"), so that, it may be easier for the user 118 to remember structural similarities and correspondence between the first user interface 104 and the second user interface 106, and provide user inputs based the structural similarities.

In another embodiment, the first aspect ratio of the first user interface 104 may be different from the second aspect ratio of the second user interface 106. For example, in order to improve ergonomics between the user 118 and the first user interface 104, the first user interface 104 may be shaped to any other structure (such as a substantially oval structure, a polygonal structure, and the like). In such scenario, the first aspect ratio of the first user interface 104 may be different from the second aspect ratio of the second user interface 106. It may be noted here that the arrangements, shapes, or structures of the first user interface 104 and the second user interface 106 shown in FIG. 4 is merely an example. The present disclosure may be also applicable to other arrangements, shapes, or structure of the first user interface 104 and the second user interface 106, without a deviation from scope of the disclosure. Certain exemplary shapes of the first user interface 104 and the second user interface 106 are also shown in FIGS. 8A-8B, 9A-9B, and 10A-10C.

FIGS. 5A-5B are diagrams that collectively illustrate a first exemplary scenario for display control of the second user interface based on inputs received on the first user interface coupled with the electronic apparatus of FIG. 1, in accordance with an embodiment of the disclosure. FIGS. 5A-5B are explained in conjunction with elements from FIG. 1, FIG. 2, FIG. 3, and FIG. 4. With reference to FIG. 5A, there is shown the first user interface 104 that is configured to receive user inputs to control the second user interface 106. The first user interface 104 may include the touch pad and the second user interface 106 may include the display screen. In an embodiment, the first user interface 104 may be configured to receive the first input from the input area (such as input area 110B from the plurality of input areas 110A-110F) of one of the plurality of zones 108A-108F (such as a zone 108B) of the first user interface 104. For example, the first input may be a tactile touch on one of the plurality of zones 108A-108F (such as at the zone 108B). The first input may be received from a user 118 (i.e. a hand or fingers of the user 118 shown in FIG. 5A). In some embodiments, the first input may be a hover input over one of the plurality of zones 108A-108F or over the plurality of input areas 110A-110F of the plurality of zones 108A-108F. In such case, the user 118 may hover his/her finger over corresponding input area of one of the plurality of zones 108A-108F to provide the first input to the first user interface 104.

Based on the received first input, the electronic apparatus 102 may be configured to determine the first display size for at least one of the plurality of sections 112A-112F of the second user interface 106. At least one of the plurality of sections 112A-112F may correspond to the one of the plurality of zones 108A-108F from which the first input is received. For example, the section 112B of the second user interface 106 may correspond to or mapped with the zone 108B of the first user interface 104. The mapping between each of the plurality of zones 108A-108F and the corresponding section of the plurality of sections 112A-112F may be prestored in the memory 206. Based on the receipt of the first input (like touch) on the zone 108B, the first user interface 104 may detect at which particular zone (such as zone 108B) the first input is received and further provide information about the detection to the circuitry 204 of the electronic apparatus 102. The provided information may indicate the zone of the plurality of zones 108A-108F at which the first input is received from the user 118. The circuitry 204 may further determine the section (such as section 112B) of the plurality of sections 112A-112F (i.e. corresponding to the detected zone (such as zone 108B on the first user interface 104), based on the prestored mapping between each of the plurality of zones 108A-108F and the corresponding section of the plurality of sections 112A-112F.

In accordance with an embodiment, the circuitry 204 may further determine the first display size for the section 112B corresponding to the zone 108B. In an embodiment, the circuitry 204 may determine the first display size for the section 112B based on at least one of: a number of the plurality of display elements 114 displayed on the second user interface 106, a number of sections of the plurality of sections 112A-112F, a size of the second user interface 106, a geometric shape of the second user interface 106, the second aspect ratio of the second user interface 106, or a resolution of the second user interface 106.

In an embodiment, the first display size (for example width, height, or thickness) for the section 112B may be determined to modify the section 112B or display elements displayed on the section 112B, based on the first input received on the corresponding zone 108B, as shown in FIG. 5A. The modification may correspond to, but is not limited to, enlargement of size (i.e. width, height, or thickness) in pixels of the section 112B or size of the display elements (such as characters "1", "2", ... "0") rendered on the section 112B, as shown in FIG. 5A.

In one embodiment, the first display size may be determined based on the display elements currently rendered on the second user interface 106. In one example, if the plurality of display elements 114 displayed on the second user interface 106 are more crowded on the second user interface 106 or may be high in number (considering the display size or the resolution of the second user interface 106), then the first display size may be determined as an appropriate size to accommodate other display elements of the plurality of display elements 114 after the modification of one section (such as section 112B). In another example, if the plurality of display elements 114 displayed on the second user interface 106 is less crowded on the second user interface 106 or may be low in number (considering the display size or the resolution of the second user interface 106), then the first display size may be determined as an appropriate size (such as maximum length/width/height size for one section). In such case, the determined first display size may enhance visibility of the display elements of the selected section (such as section 112B) and also accommodate other display elements of other sections of the plurality of sections 112A-112F (such as section 112A, section 112C, section 112D, and so on), as shown in FIG. 5A.

In another embodiment, the first display size may be determined based on the number of sections of the plurality of sections 112A-112F on the second user interface 106. The number of the plurality of sections 112A-112F may be based on the number of the plurality of display elements 114 displayed on the second user interface 106 and/or a display layout of the plurality of display elements 114. For example, in case the number of the plurality of display elements 114 are large, the electronic apparatus 102 may control the second user interface 106 to group more number of the plurality of display elements 114 to form the number of the plurality of sections 112A-112F. In other example, in case the number of the plurality of display elements 114 are less in number, the electronic apparatus 102 may control the second user interface 106 to group less number of the plurality of display elements 114 to form the number of the plurality of sections 112A-112F. In some embodiments, the display elements related or close to one another may be used to form a particular section of the plurality of sections 112A-112F. As shown in FIGS. 4 and 5A, the display elements (i.e. characters "1", "2", ... "0") are grouped to form one section (such as section 112B) and the display elements (i.e. characters "q", "w", "p") are grouped to form another section (such as section 112C). In an embodiment, the number of the plurality of sections 112A-112F may be based on the total number of the plurality of display elements 114 to be displayed on the second user interface 106, size of each display element, and display layout (i.e. portrait or landscape) of the plurality of display elements 114 displayed on the second user interface 106 (as also described, for example, in FIG. 4). In accordance with an embodiment, the circuitry 204 may control the first user interface 104 to have the number of the plurality of zones 108A-108F to be same as the number of the plurality of sections 112A-112F on the second user interface 106 and store the correspondence and mapping with the plurality of zones 108A-108F and the plurality of sections 112A-112F in the memory 206. In accordance with another embodiment, the circuitry 204 may be configured to divide all in-built touch sensors (not shown) associated with the first user interface 104 (i.e. touch pad) to form each of the plurality of zones 108A-108F in the first user interface 104, based on the plurality of sections 112A-112F of the second user interface 106. For example, the electronic apparatus 102 may be configured to equally divide all the touch sensors associated with the first user interface 104, in case size of each of the plurality of zones 108A-108F is same, based on the plurality of sections 112A-112F of the second user interface 106.

In an embodiment, the first display size of a particular section (such as section 112B) may be determined for the modification, based on the number of the plurality of display elements 114 and number of the plurality of sections 112A-112F. In an example, with more number of plurality of sections 112A-112F, the modification (i.e. enlargement in size) of the section 112B may be less, as compared to the modification of the section 112B in case there are less number of the plurality of sections 112A-112F rendered on the second user interface 106.

In another embodiment, the first display size of the one of the plurality of sections 112A-112F (such as the section 112B) may be determined based on physical elements of the second user interface 106. In one example, in case the size or the display layout (or resolution) of the second user interface 106 is large, the determined first display size may also be large because of a large screen space provided by the second user interface 106. In other example, in case the size or the display layout (or resolution) of the second user interface 106 is small, the determined first display size may also be minimal because of a small screen space provided by the second user interface 106. In yet another example, in case of the substantially rectangular shape of the second user interface 106, the first display size may be determined for the section 112B (i.e. to be modified) in order to accommodate all the plurality of display elements 114 on the substantially rectangular shape of the second user interface 106.

Based on the determined first display size (i.e. size in pixels), the electronic apparatus 102 or the circuitry 204 may further control the second user interface 106 to modify at least one display element (such as display elements "1", "2", . . . "0" rendered on the section 112B) of at least one (i.e. section 112B) of the plurality of sections 112A-112F. In an embodiment, based on the determined first display size, the circuitry 204 associated with the electronic apparatus 102 may be further configured to control the second user interface 106 to enlarge a first graphic size (such as height/length/width in pixels) of the plurality of display elements 114 associated with at least one of the plurality of sections 112A-112F. For example, as shown in FIG. 5A, at the section 112B of the plurality of sections 112A-112F of the second user interface 106, the plurality of display elements 114 (such as the textual characters, for example, numbers from "1" to "0") may be enlarged to the first graphic size based on the determined first display size. The first graphic size may indicate exact number of pixels to enlarge the size of the display elements or indicate an amount of percentage of enlargement (for example 50% increase) to be applied on the respective size of the display elements associated with the section (i.e. section 112B) corresponding to the zone (i.e. zone 108B) of the first user interface 104 from which the first user input is received.

Further, the circuitry 204 may control the second user interface 106 to enlarge the first graphic size (such as height/length/width in pixels) of the plurality of display elements 114 associated with the selected section (for example the section 112B), in at least one of: a horizontal space or a vertical space, based on the determined first display size. For example, based on the second aspect ratio or the resolution of the second user interface 106, the electronic apparatus 102 may be configured to enlarge the first graphic size of the plurality of display elements 114 associated with the selected section (for example the section 112B) of the plurality of sections 112A-112F. For instance, in case the second user interface 106 has a horizontal screen space that is larger as compared to a vertical screen space of the second user interface 106 (such as 1024*768 pixels resolution), the circuitry 204 may control the second user interface 106 to enlarge the first graphic size of the plurality of display elements 114 associated with the selected section, in the horizontal space.

In other instance, in case the second user interface 106 has the horizontal screen space that is smaller as compared to the vertical screen space of the second user interface 106, the circuitry 204 may control the second user interface 106 to enlarge the first graphic size of the plurality of display elements 114 associated with the selected sections, in the vertical space. In yet other instance, the circuitry 204 may control the second user interface 106 to enlarge the first graphic size of the plurality of display elements 114 associated with the selected section 112B of the plurality of sections 112A-112F, in both the horizontal space and the vertical space. For example, as shown in FIG. 5A (in comparison to FIG. 4), the display elements (i.e. textual characters "1", "2" . . . "0") of the section 112B are enlarged both horizontally and vertically, based on the touch input received at the corresponding zone 108B on the first user interface 104. In another example, as shown in FIG. 5A, the complete section 112B may be modified (or enlarged) based on the determined first display size for the section 112B of the plurality of sections 112A-112F. Therefore, based on the enlarged section 112B or included display elements, the user 118 may clearly view the display elements corresponding to the zone 108B which is selected based on the first input (i.e. touch input) provided to the first user interface 104. In an embodiment, the circuitry 204 may control the second user interface 106 to modify the display elements (for example the size of the particular section including the display elements) after a first predefined time (in milliseconds or seconds), based on the receipt of the first input, as the hover input, on a particular zone of the plurality of zones 108A-108F on the first user interface 104. The first predefined time may be taken by the circuitry 204 (or by the first user interface 104) to accurately recognize the hover input as a genuine first input, to further modify the display elements on the second user interface based on the recognized first input. For example, in the case of the hover input, the user must hold their finger on the desired zone (for example zone 108B shown in FIG. 4) for the first predefined time (in milliseconds or seconds) for the first input to be correctly recognized for further modification of the corresponding section (or display elements) shown in FIG. 5A.

In accordance with an embodiment, based on the enlargement of the first graphic size (such as at the section 112B), the circuitry 204 may be further configured to control the second user interface 106 to modify the plurality of display elements 114 associated with other sections (such as section 112A, and sections 112C-112F) of the plurality of sections 112A-112F, based on the determined first display size. In some embodiments, the circuitry 204 may control the display size of the other sections (i.e. section 112A and sections 112C-112F) of the plurality of sections 112A-112F, based on the modification (i.e. enlargement) performed on the one selected section (i.e. section 112B) for which the first input is received, via the corresponding zone 108B. For example, as shown in FIG. 5A, the section 112A and the sections 112C-112F (i.e. other than section 112B) of the plurality of sections 112A-112F may be modified to accommodate the enlarged size of the selected section 112B of the plurality of sections 112A-112F. In an embodiment, the circuitry 204 may control the second user interface 106 to reduce a second graphic size of the plurality of display elements 114 associated with the other sections (such as section 112A and sections 112C-112F) of the plurality of sections 112A-112F. For example, the circuitry may reduce the second graphic size (i.e. dimension in pixels) of the other sections to accommodate the enlarged size of the section 112B, as shown in FIG. 5A (in comparison to FIG. 4). Further, based on the reduction of the second graphic size, the circuitry 204 may further control the second user interface 106 to move the plurality of display elements 114 associated with the other sections (such as section 112A and sections 112C-112F) of the plurality of sections 112A-112F. For example, as shown in FIG. 5A, based on the enlargement of the first graphic size (such as at the section 112B), the circuitry 204 may be further configured to control the second user interface 106 to move the other sections (such as section 112A and sections 112C-112F) of the plurality of sections 112A-112F along a first direction 500, so that the enlargement of the section 112B may be accommodated in the second user interface 106.

It may be noted that the modification and the movement of the other sections (such as the section 112A and the sections 112C-112F) based on the modification of the selected section (i.e. the section 112B) shown in FIG. 5A is merely presented as an example. In certain embodiments, based on the modification (i.e. enlargement) of the one section (i.e. selected section 112B), other sections may not be modified or moved by the disclosed electronic apparatus 102, without any deviation from the scope of the disclosure.

The circuitry 204 of the electronic apparatus 102 may be further configured to determine the first zone size for the one zone (such as zone 108B) of the plurality of zones 108A-108F of the first user interface 104 from which the first input is received, based on the determined first display size for at least one section (such as section 112B) of the plurality of sections 112A-112F of the second user interface 106. The circuitry 204 may determine the first zone size for the modification of the size or input area (such as input area 110B) of the one zone (such as zone 108B) of the plurality of zones 108A-108F of the first user interface 104, from which the first input is received. The first zone size may indicate an area or portion of the first user interface 104 to be assigned to one zone (such as zone 108B) from which the first input is received from the user 118. The first zone size may indicate a size or percentage of the area to be modified (i.e. increase or decrease) for the particular zone of the plurality of zones 108A-108F from which the first input is received. In an embodiment, the circuitry 204 may be further configured to determine the first zone size based on at least one of: a surface area of the first user interface 104, the first aspect ratio of the first user interface 104, a geometric shape of the first user interface 104, or a number of the plurality of zones 108A-108F in the first user interface 104.

In an example, if the plurality of zones 108A-108F in the first user interface 104 are more crowded or may be high in number (considering the surface area of the first user interface 104), the first zone size may be determined with an appropriate size to accommodate other zones of the plurality of zones 108A-108F in the first user interface 104 after the modification of one zone (such as zone 108B). In another example, if the plurality of zones 108A-108F on the first user interface 104 are less crowded or may be low in number (considering the surface area of the first user interface 104), then the first zone size may be determined with an appropriate size (such as maximum length/width/height size for one zone) to accommodate other zones of the plurality of zones 108A-108F in the first user interface 104 after the modification. In such case, the determined first zone size (for example width/height) for the zone 108B (shown in FIG. 5A) may be higher or enlarged than the zone size of the zone 108B (shown in FIG. 4). In other words, with increased zone size of the zone 108B, more number of touch sensors (not shown) of the first user interface 104 may be allocated to the zone 108B, in comparison to the number of touch sensors allocated to other zones of the plurality of zones 108A-108F. The enlarged zone size of the zone 108B (i.e. from which the first input is received) may enhance navigation or control of the selected display elements or the selected section 112B, via the first user interface 104.

In an embodiment, the number of the plurality of zones 108A-108F of the first user interface 104 may be same as the number of the plurality of sections 112A-112F of the second user interface 106. For example, in order to match the correspondence between each of the plurality of zones 108A-108F of the first user interface 104 and at least one section of the plurality of sections 112A-112F of the second user interface 106, it may be necessary to have the number of plurality of zones 108A-108F of the first user interface 104 to be same as the number of the plurality of sections 112A-112F of the second user interface 106.

In another embodiment, the first zone size may be determined based on surface area of the first user interface 104. In one example, in case the surface area of the first user interface 104 is large, the determined first zone size for the zone 108B (in comparison to other zones) may also be substantially large. Further, in case the surface area of the first user interface 104 is small, the determined first zone size for the zone 108B may be substantially similar, but higher, in comparison to the modified sizes of other zones of the plurality of zones 108A-108F. In an embodiment, in case of the substantially rectangular shape of the first user interface 104, the first zone size may be determined in order to accommodate all the plurality of zones 108A-108F after modification.

In an embodiment, the circuitry 204 may further control the first user interface 104 to modify the input area (or size) of the one zone (i.e. zone 108B) of the plurality of zones 108A-108F, based on the determined first zone size. In an embodiment, the circuitry 204 may control the first user interface 104 to enlarge (as modification) the input area (such as input area 110B) of the one zone (such as the zone 108B) of the plurality of zones 108A-108F, based on the determined first zone size, as shown in FIG. 5A. In an embodiment, the electronic apparatus 102 may control the first user interface 104 to enlarge the input area (such as input area 110B) of the one (such as the zone 108B) of the plurality of zones 108A-108F, in at least one of: a horizontal space of the first user interface 104 or a vertical space of the first user interface 104, based on the determined first zone size.

In an embodiment, based on the first aspect ratio of the first user interface 104, the circuitry 204 may be configured to enlarge the input area (such as input area 110B) of the plurality of input areas 110A-110F associated with the plurality of zones 108A-108F. For instance, in case the first user interface 104 has the horizontal space that is large in size as compared to the vertical space of the first user interface 104, the circuitry 204 may control the first user interface 104 to enlarge the input area (such as input area 110B) associated with at least one zone (like zone 108B) in the horizontal space. In other instance, in case the first user interface 104 has the horizontal space that is smaller in size as compared to the vertical space of the first user interface 104, the circuitry 204 may control the first user interface 104 to enlarge the input area (such as input area 110B) for at least one zone (like zone 108B) of the plurality of zones 108A-108F, in the vertical space. In an embodiment, the circuitry 204 may control the first user interface 104 to enlarge the input area (such as input area 110B) associated with at least one of the plurality of zones 108A-108F, in both the horizontal space and the vertical space. As shown in FIG. 5A, the input area 110B of the zone 108B of the first user interface 104 may be modified (i.e. enlarged) based on the change in size of the section 112B of the second user interface 106. The modified (or enlarged) input area of the zone 108B by the disclosed electronic apparatus 102, may further allow the user 118 to easily navigate the selected zone and control the display elements on the corresponding section (such as section 112B), without any interference or accidental selection of other display elements on other sections of the second user interface 106.

The circuitry 204 of the electronic apparatus 102 may be further configured to control the first user interface 104 to modify the plurality of input areas (such as input areas 110A and 110C-110F) associated with other zones (such as zone 108A and zones 108C-108F) of the plurality of zones 108A-108F, based on the determined first zone size for the one zone 108F or based on the modification of the one zone 108F. For example, as shown in FIGS. 5A and 5B, the other zones 108A, 108C-108F (i.e. other than the zone 108B) of the plurality of zones 108A-108F may be modified (i.e. reduction in size in comparison to FIG. 4) to accommodate the enlarged size of the zone 108B of the plurality of zones 108A-108F.

In an embodiment, the circuitry 204 may control the first user interface 104 to reduce the sizes of the input areas associated with the others of the plurality of zones 108A-108F, such the zone 108A and zones 108C-108F. The reduction of the sizes of the input areas of the other zones is to accommodate the enlarged size of the zone 108B, from which the first input is received. Further, in addition to the reduction in size of the input areas of other zones (such the zone 108A and zones 108C-108F), the circuitry 204 may further control the first user interface 104 to move the plurality of input areas (such as input area 110A and input areas 110C-110F) associated with the other zones (such as zone 108A and zones 108C-108F) of the plurality of zones 108A-108F. For example, as shown in FIG. 5A, upon the enlargement of the size of the zone 108B, the circuitry 204 may be further configured to control the first user interface 104 to move other zones (i.e. other than zone 108B) of the plurality of zones 108A-108F along a second direction 502, so that, the enlargement of the zone 108B may be accommodated in the first user interface 104.

It may be noted that the modification and the movement of the other zones (such the zone 108A and zones 108C-108F) based on the modification of the selected zone (i.e. the zone 108B) shown in FIG. 5A is merely presented as an example. In certain embodiments, based on the modification (i.e. enlargement) of the one zone (i.e. selected zone 108B), other zones may not be modified or moved by the disclosed electronic apparatus 102, without any deviation from the scope of the disclosure.

In an embodiment, for the first input (as the hover input), once the first predefined time is met, then the circuitry 204 may control the second user interface 106 to modify the selected section (such as section 112B shown in FIG. 5A) based on the determined first display size, and further (or simultaneously) control the first user interface 104 to modify the selected zone (such as zone 108B shown in FIG. 5A) based on the determined first zone size. In case the first predefined time is not met, the circuitry 204 (or the first user interface 104) may discard the first input (as the hover input) considering that the user 118 may probably be swiping or moving their finger on the first user interface 104, without an intent to select a particular zone (such as zone 108B shown in FIG. 4). In another embodiment, in case the first input is the touch input, then the circuitry 204 may not apply (or wait till) the first predefined time, and directly control the second user interface 106 to modify the selected section (or selected display element) and the further (or simultaneously) control the first user interface to modify the selected zone (or sub-zones) based on the received touch input, as shown in FIGS. 5A-5B.

Now with respect to FIG. 5B, based on the enlargement of the section 112B of the plurality of sections 112A-112F, and the enlargement of the zone 108B of the plurality of zones 108A-108F, the circuitry 204 may be configured to determine a sub-zone size to control the plurality of sub-zones 104A of the zone 108B of the plurality of zones 108A-108F. For example, the circuitry 204 may be configured to determine the sub-zone size for each of the plurality of sub-zones 104A of one zone (such as the zone 108B) of the first user interface 104 from which the first input is received. The sub-zone size may be determined based on the determined first display size for at least one section (such as section 112B) of the plurality of sections 112A-112F of the second user interface 106, and/or determined based on the number of the plurality of display elements 114 (such as character "1", "2", ... "0") on the corresponding/selected section (such as section 112B), and/or determined based on the size of the corresponding zone (such as zone 108B).

In an embodiment, the circuitry 204 may determine the sub-zone size for the modification of the size or input area (such as input area 110B) of the plurality of sub-zones 104A of one zone (such as zone 108B) from which the first input is received. The sub-zone size may indicate an area or portion of the first user interface 104 to be assigned to the plurality of sub-zones 104A of one zone (such as zone 108B) from which the first input is received from the user 118. In an embodiment, the circuitry 204 may be further configured to determine the sub-zone size based on at least one of: a surface area of the first user interface 104, the first aspect ratio of the first user interface 104, a geometric shape of the first user interface 104, or a number of the plurality of sub-zones 104A of the particular zone in the plurality of zones 108A-108F of the first user interface 104.

In an embodiment, the circuitry 204 may take a second predefined time (for example in milliseconds or seconds), to determine the sub-zone size and modify the size of the plurality of sub-zones 104A of the selected zone. In other words, the second predefined time may be taken to break the selected zone (such as zone 108B shown in FIG. 5A) into the plurality of sub-zones 104A (shown in FIG. 5B) and to modify the corresponding display element (for example character "6" shown in FIG. 5B). In an embodiment, the circuitry 204 may control the first user interface 104 to modify the sizes of the plurality of sub-zones 104A of the particular zone after the modification on one of the plurality of sections 112A-112F of the second user interface 106. In an embodiment, the sub-zone size may indicate a size or percentage of the area to be modified (i.e. increase or decrease) for the plurality of sub-zones 104A of the particular zone (such as zone 108B), based on the modification of one of the plurality of sections 112A-112F of the second user interface 106. In an embodiment, the sub-zone size may indicate an enlarged size or percentage of the area of one of a sub-zone from the plurality of sub-zones 104A. In such embodiment, the enlarged sub-zone size may prevent unintended user inputs from other sub-zones of the plurality of sub-zones 104A. For example, in case of enlarged sub-zone size, the user inputs received on one sub-zone may not interfere with other sub-zones of the plurality of sub-zones 104A within the particular zone (such as zone 108B) of the plurality of zones 108A-108F of the first user interface 104.

Figure 7A:
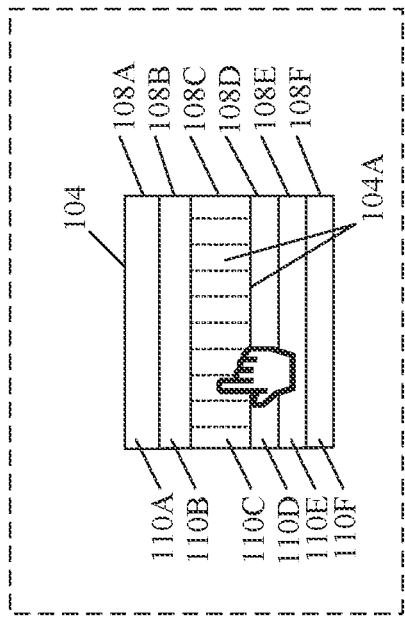
FIGS. 7A-7B are diagrams that collectively illustrate a third exemplary scenario for display control of the second user interface based on inputs received on the first user interface coupled with the electronic apparatus of FIG. 1, in accordance with an embodiment of the disclosure.
Figure 7A:
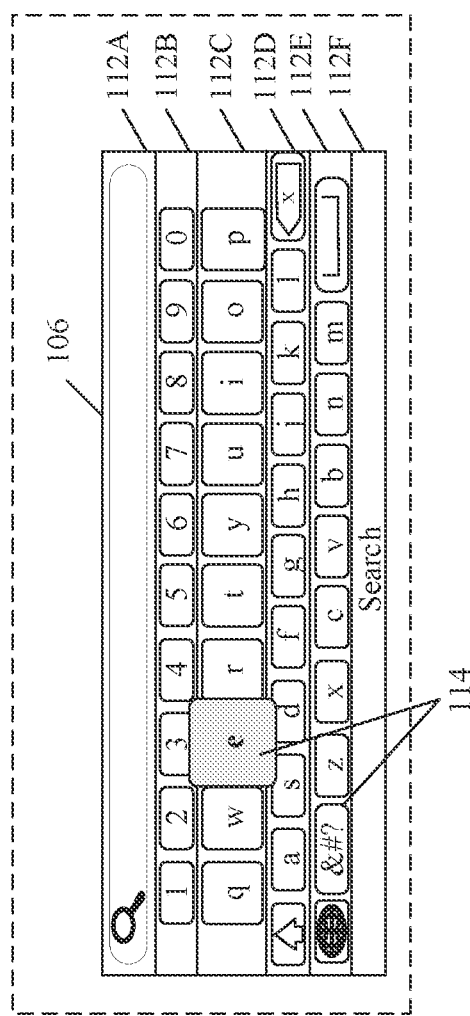
Figure 7B:
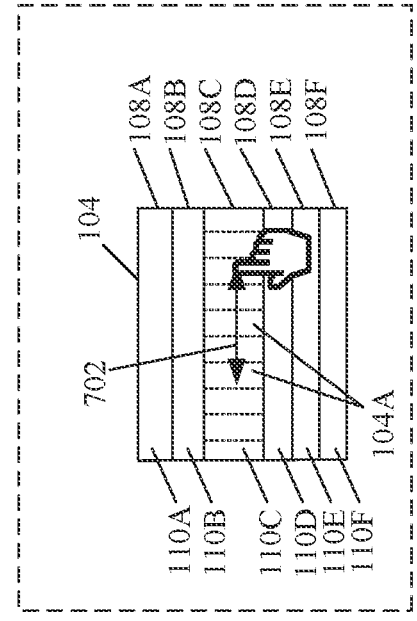
Figure 7B:
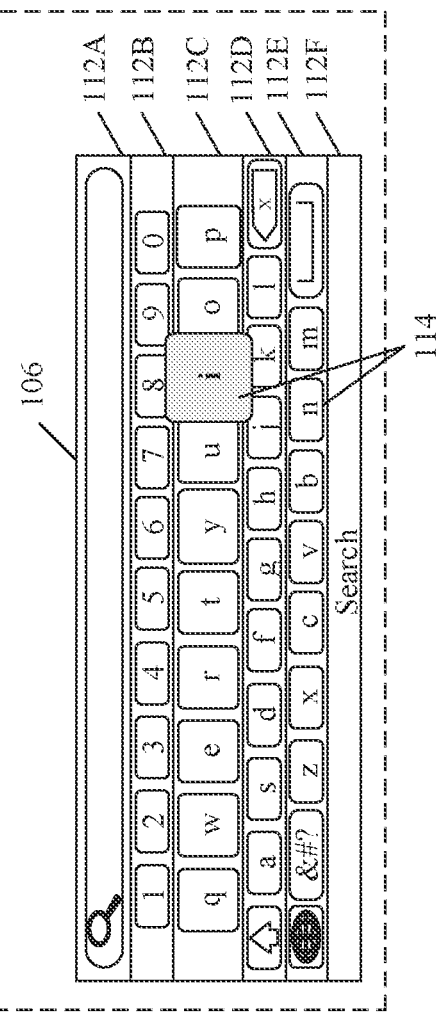

In an embodiment, the first user interface 104 may be further configured to receive user inputs on the plurality of sub-zones 104A of the zone 108B to select a display element (such as a textual character "6") from the plurality of display elements 114 within the enlarged section 112B of the plurality of sections 112A-112F. For example, the user 118 may first select the zone 108B from the plurality of zones 108A-108F of the first user interface 104, and then the user 118 may slide along a third direction 504 (as shown in FIG. 5B) on the plurality of sub-zones 104A of the selected zone 108B to select a particular display element within the selected section 112B. In an embodiment, based on the received user inputs about the sliding along the third direction 504 on the first user interface 104, the circuitry 204 may control the second user interface 106 to select a particular display element (such as the textual character) of the plurality of display elements 114 on the enlarged section 112B. For example, when the user 118 slides horizontally over the selected zone 108B along the third direction 504, the corresponding display element of the plurality of display elements 114 on the corresponding section (such as section 112B) may enlarge on the second user interface 106 to demonstrate which display element (such as the textual character "6") the user 118 is sliding over. In such case, the size of display element (i.e. character "6") may be larger as compared to sizes of other display elements (i.e. characters "1" to "5" and "7" to "0") on the selected section 112B, as shown in FIG. 5B. In another example, the size of the selected display element may be enlarged as shown in FIGS. 7A-7B, where the graphic size of the selected display element is enlarged to partially overlap other display elements on same selected section or on other nearby sections. Thus, based on the horizontal slide movement on the zone 108B, the size of a particular display element on the corresponding section 112B may be enlarged as compared to other display elements on the same section 112B, such that the user 118 may clearly view or control the selected display element in comparison to other nearby display elements.

In another embodiment, the circuitry 204 may control the second user interface 106 to only enlarge the corresponding display element, without the modification (i.e. enlargement) of any of the plurality of sections 112A-112F of the second user interface 106. In such embodiment, the circuitry 204 of the electronic apparatus 102 may be configured to control the second user interface 106 to enlarge the first graphic size of at least one display element (such as a textual character "6") associated with at least one of the plurality of sections 112A-112F, based on the determined first display size. As the disclosed electronic apparatus 102 may control the second user interface 106 to directly enlarge at least one display element from the plurality of display elements 114, and the time to modify the sizes of the plurality of sections 112A-112F may be saved, which may be quick and easier for the user 118 to navigate within the plurality of display elements 114 of the second user interface 106, via the first user interface 104.

In some embodiments, the circuitry 204 of the electronic apparatus 102 may be further configured to control the second user interface 106 to modify at least one display element associated with other sections (such as section 112A and the sections 112C-112F). For example, the circuitry 204 may control the second user interface 106 to reduce the second graphic size of at least one display element associated with the other sections (such as section 112A and the sections 112C-112F) of the plurality of sections 112A-112F. In addition to the reduction in the second graphic size, the circuitry 204 may control the second user interface 106 to move at least one display element associated with the other sections along the first direction 500. In another embodiment, the circuitry 204 may only enlarge the selected display element (such as a textual character "6" shown in FIG. 5B), without any modification of size or movement of the display elements (such as textual characters "1"-"5" and "7"-"0") associated with the selected section (i.e. section 112B) or without any modification of size or movement of all display element associated with the other sections (such as section 112A and the sections 112C-112F) of the plurality of sections 112A-112F.

In an embodiment, the electronic apparatus 102 may control the first user interface 104 to receive a second input from the input area (such as input area 110B) of the one of the plurality of zones 108A-108F, such as the zone 108B of the first user interface 104. The second input may correspond to a selection of at least one display element (such as a textual character "6") of at least one of the plurality of sections 112A-112F (such as section 112B) of the second user interface 106. For example, when sliding along the third direction 504, in case the user 118 notices the enlargement of the desired display element (such as a textual character "6"), the user 118 may select the enlarged display element to provide the second input by depressing on a part of the first user interface 104. In an example, the part of the first user interface 104 may include the input area 110B that may correspond to the enlarged display element (such as a textual character "6").

In an embodiment, based on the selection of at least one display element (such as a textual character "6"), the circuitry 204 may further retrieve, from the memory 206, control instructions associated with the selected at least one display element (such as a textual character "6"). The circuitry 204 may further execute the retrieved control instructions associated with the selected display element. For example, the retrieved control instructions related to the selected display element (i.e. textual character "6") may include, but is not limited to, typing a textual character (such as number "6") on a screen or on a text editor application. Although the selection shown in FIG. 5B is related to textual character, one skilled in the art may understand that the selection may be performed on any display element from the plurality of display elements 114 of the second user interface 106, such as, the graphical icon or the image, and the like.

Figure 6A:
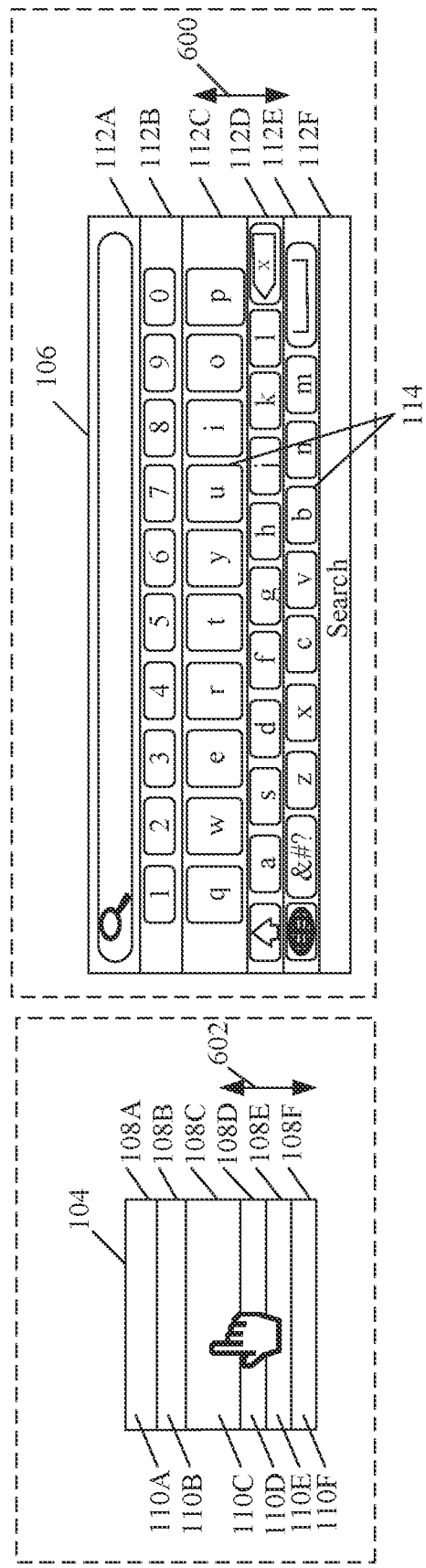
FIGS. 6A-6B are diagrams that collectively illustrate a second exemplary scenario for display control of the second user interface based on inputs received on the first user interface coupled with the electronic apparatus of FIG. 1, in accordance with an embodiment of the disclosure.
Figure 6B:
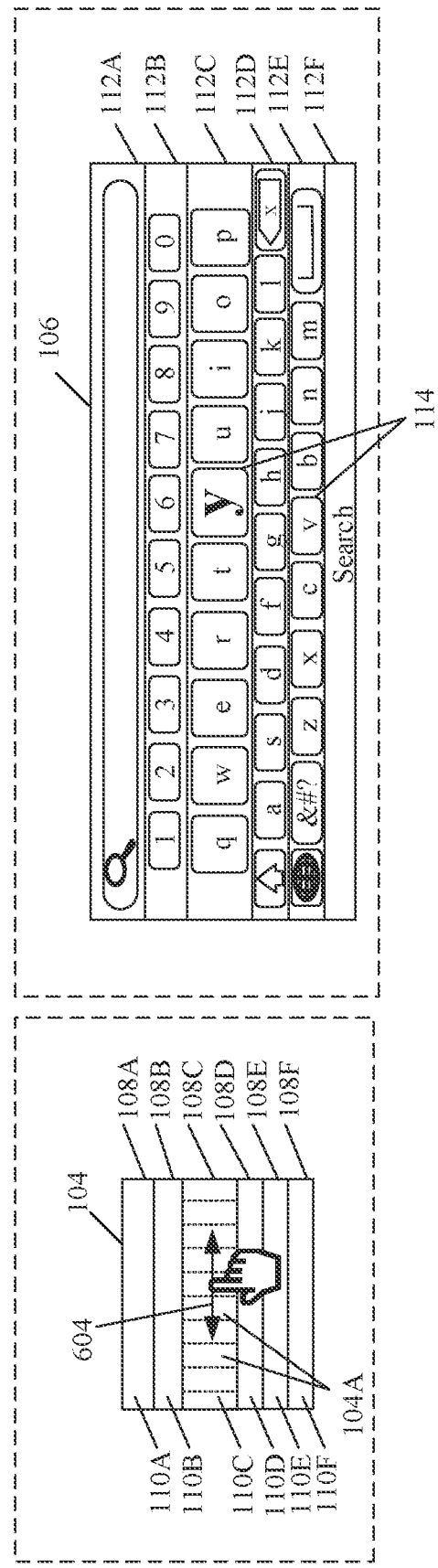

FIGS. 6A-6B are diagrams that collectively illustrate a second exemplary scenario for display control of the second user interface based on inputs received on the first user interface coupled with the electronic apparatus of FIG. 1, in accordance with an embodiment of the disclosure. FIG. 6 is explained in conjunction with elements from FIG. 1, FIG. 2, FIG. 3A, FIG. 4, and FIGS. 5A-5B. With reference to FIG. 6, there is shown the first user interface 104 that is configured to control the second user interface 106.

In an embodiment, as shown in FIG. 6A, in order to move to other zone (such as zone 108C) from the selected zone (such as zone 108B) of the plurality of zones 108A-108F of the first user interface 104, the user 118 may slide their fingers from the selected zone (such as zone 108B) to the other zone (such as zone 108C) of the plurality of zones 108A-108F. Once the user 118 touch input reaches the other zone (such as zone 108C), the circuitry 204 of the electronic apparatus 102 may control the second user interface 106 to enlarge the corresponding section (such as section 112C from the plurality of sections 112A-112F), in same manner as described for example for the section 112B in FIG. 5A, as each of the plurality of sections 112A-112F are distinct from each other. For example, circuitry 204 may again determine the first display size of the section 112C corresponding to the zone 108C from which the touch input is recently received (as shown in FIG. 6A). Further, the circuitry 204 may control the second user interface 106 to modify (i.e. enlarge) the corresponding section (such as section 112C) based on the determined first display size for the section 112C, as similarly described, for example in FIG. 5A with respect to the section 112B. Upon enlargement of the corresponding section (such as section 112C), the circuitry 204 may be further configured to control the second user interface 106 to move the other sections (such as sections 112A-112B and the sections 112D-112F) of the plurality of sections 112A-112F along a first direction 600, so that, the enlargement of the section 112C may be accommodated in the second user interface 106, as described also in FIGS. 5A-5B.

Based on the enlargement of the corresponding section (such as section 112C from the plurality of sections 112A-112F), the corresponding input area (such as area 110C) of the zone 108C may also be enlarged, such that the user 118 may easily navigate along the enlarged area of the zone 108C and accordingly control the display elements (such as characters "q", "w" . . . "p") of the corresponding section 112C on the second user interface 106. Upon enlargement of the zone 108C, the circuitry 204 may be further configured to control the first user interface 104 to move other zones (such as zones 108A-108B and zones 108D-108F) of the plurality of zones 108A-108F along a second direction 602, so that the enlargement of the zone 108C may be accommodated in the first user interface 104, as shown in FIG. 6A.

With respect to FIG. 6B, the user 118 may slide along a third direction 604 within the selected zone 108C (or over the plurality of sub-zones 104A) of the plurality of zones 108A-108F. In an embodiment, when the user 118 slides along the third direction 604 on the first user interface 104, the circuitry 204 may control the second user interface 106 to select a particular display element (such as the textual character "Y") of the plurality of display elements 114 based on the corresponding touch input on the first user interface 104. For example, when the user 118 slides along the third direction 604, the corresponding display element (such as the textual character "Y" shown in FIG. 6B) of the plurality of display elements 114 may be enlarged on the corresponding section 112C of the second user interface 106 to demonstrate which display element (such as the textual character) the user 118 is sliding over. For example, in FIG. 6B, when the user 118 slides over along the third direction 604, the display element (such as the textual character "Y") out of the plurality of display elements 114 on the section 112C may be enlarged to demonstrate the selection of such display element (such as the textual character "Y"). Upon reaching the desired display element, the user 118 may depress the part of the first user interface 104 to execute control instructions associated with such display element, as described for example, in FIG. 5B.

FIGS. 7A-7B are diagrams that collectively illustrate a third exemplary scenario for display control of the second user interface based on inputs received on the first user interface coupled with the electronic apparatus of FIG. 1, in accordance with an embodiment of the disclosure. FIGS. 7A-7B are explained in conjunction with elements from FIG. 1, FIG. 2, FIG. 3, FIG. 4, FIGS. 5A-5B, and FIGS. 6A-6B. With reference to FIGS. 7A-7B, there is shown the first user interface 104 to control the second user interface 106.

In an embodiment, based on the selection of the display element (as described in FIGS. 5A-5B), the circuitry 204 of the electronic apparatus 102 may be configured to control the second user interface 106 to change a display characteristics of the selected display element of at least one of the plurality of sections 112A-112F based on the received first input. For example, the display characteristics may include, but is not limited to, at least one of: color, brightness, contrast, highlighting, font style, font size, graphic size, or animation.

Referring to FIG. 7A, based on the selection, at least one display element (such as a textual character "e") of at least one of the plurality of sections 112A-112F (such as section 112C) may have different display characteristics compared to other display elements associated with the plurality of sections 112A-112F of the second user interface 106. The change in the display characteristics may include, for example, change in the color (either font color or background color), change in the brightness (for example, 20% more brightness compared to other display elements of the plurality of display elements 114), change in the contrast (for example, 20% more contrast compared to other display elements), change in the highlighting, change in the font style (such as bold, italics, underline, strikethrough, and the like), or change in the font size (for example, change from 5 pixels to 15 pixels based on the size of the second user interface 106), or change in the animation (for example, a 2D animation, a 3D animation, a motion picture, and the like), or even change in the graphic size (for example, a change in a button size of the textual character "e" as shown in FIG. 7A). In an example, the graphic size (for example, a change in a button size of the textual character "e") may be further enlarged from the selected section (such as the section 112C) and partially overlap over other sections (such as the section 112B and/or the section 112D) of the second user interface 106 to indicate the selection of that particular display element (such as the textual character "e"). In some embodiments, the circuitry 204 may control the second user interface 106 to change the display characteristics of the selected display element, rather than modification (i.e. enlargement) of the size of the selected display element (i.e. as described, for example, in FIGS. 5A-5B). Such change in the display characteristics may further improve visual appearance of the selected display element for the user 118 and further, it may be easier for the user 118 to view the selected display element from the plurality of display elements 114 on the second user interface 106. In some embodiments, the circuitry 204 may control the second user interface 106 to display information (for example in form of an animation, icon, or textual cue) to indicate modification (for example enlargement) of the selected section (such as section 112B in FIG. 5A) or to indicate change in the display characteristics of the selected display element (such as a textual character "e" in FIG. 7A). In some other embodiments, the circuitry 204 may further control the second user interface 106 to display information (for example in form of an animation, icon, or textual cue) to indicate modification of the selected zone (such as zone 108B in FIG. 5A) on the first user interface 104 or to indicate modifications (such as reduction in size or movement) of other zones (such as zone 108A and/or zones 108C-108F) on the first user interface 104.

In an alternate embodiment, but not shown, the circuitry 204 may control the second user interface 106 to change the display characteristics (for example, color, outline, brightness, contrast, highlighting, font style, or animation) of the selected section (such as section 112B in FIG. 5A), rather than modification (i.e. enlargement) of the size of the selected section. Such change in the display characteristics may further improve visual appearance of the selected section for the user 118 and further, it may be easier for the user 118 to view the selected section from the plurality of sections 112A-112F on the second user interface 106. In another embodiment, the circuitry 204 may be further configured to control the first user interface 104 to provide a tactile feedback (such as vibration signals) on the selected zone of the plurality of zones 108A-108F, to indicate modification (for example enlargement) of the selected section (such as section 112B in FIG. 5A).

With respect to FIG. 7B, the user 118 may slide along a horizontal direction 702 within the selected zone 108C of the plurality of zones 108A-108F. In an embodiment, when the user 118 slides along the horizontal direction 702 on the first user interface 104, the second user interface 106 may change the display characteristics of each display element on the section 112C, based on the correspondence with the touch inputs on the zone 108C of the first user interface 104. For example, in FIG. 7B, when the user 118 slides along the horizontal direction 702, the display element (such as the textual character "i") of the plurality of display elements 114 may change its display characteristics (such as bold font, and gray color highlighting and increased graphic size) on the second user interface 106 to demonstrate the selection of such display element (such as the textual character "i"). In another embodiment, the circuitry 204 may be further configured to control the first user interface 104 to provide a tactile feedback (such as vibration signals) on the plurality of sub-zones 104A of the selected zone (such as zone 108C) of the plurality of zones 108A-108F, to indicate modification (for example enlargement) of the selected display element. For example, in FIG. 7B, when the user 118 slides along the horizontal direction 702, the user 118 may experience the tactile feedback (such as the vibration signals) based on the selection of the display element (such as the textual character "i") of the plurality of display elements 114. Upon reaching the desired display element, the user 118 may depress the part of the first user interface 104 to execute control instructions associated with such display element, as described for example, in FIG. 5B.

FIGS. 8A, 8B, 9A, 9B, 10A, 10B, and 10C are diagrams that illustrate different exemplary structures and shapes of a first user interface and a second user interface coupled with the electronic apparatus of FIG. 1, in accordance with an embodiment of the disclosure. FIGS. 8A, 8B, 9A, 9B, 10A, 10B, and 10C are explained in conjunction with elements from FIG. 1, FIG. 2, FIG. 3, FIG. 4, FIGS. 5A-5B, 6A-6B, and 7A-7B.

Figure 8A:
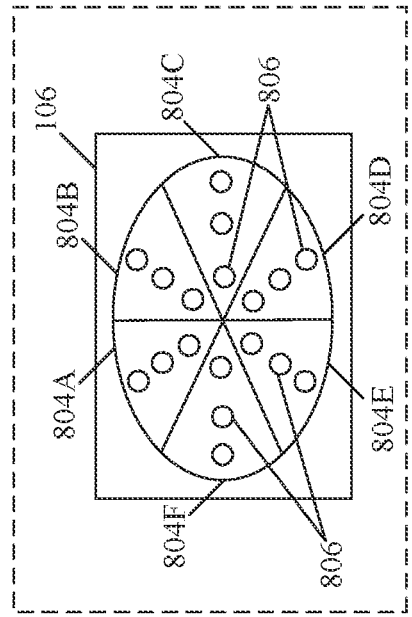
FIGS. 8A, 8B, 9A, 9B, 10A, 10B, and 10C are diagrams that illustrate different exemplary structures and shapes of a first user interface and a second user interface coupled with the electronic apparatus of FIG. 1, in accordance with an embodiment of the disclosure.
Figure 8A:
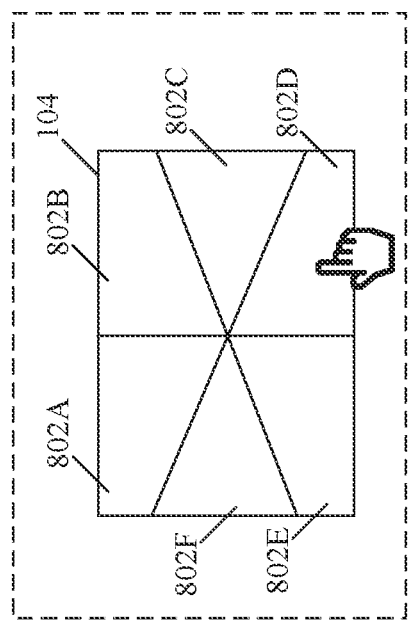
Figure 8B:
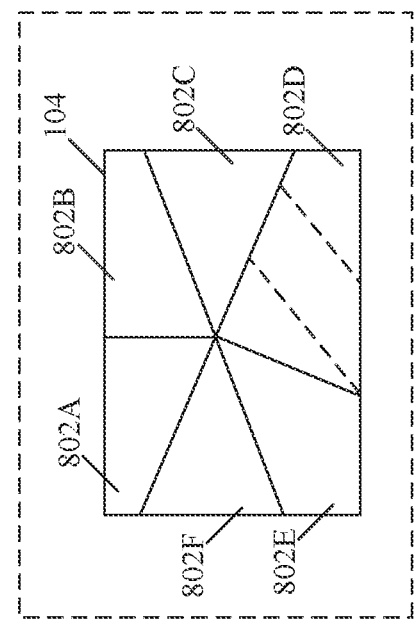

With reference to FIGS. 8A-8B, there is shown the first user interface 104 to control the second user interface 106. The first user interface 104 (for example touchpad) may include a plurality of zones 802A-802F and the second user interface 106 (for example display screen) may include a plurality of sections 804A-804F. As shown in FIG. 8A, the plurality of zones 802A-802F and the plurality of sections 804A-804F may form a particular shape which is different from the shape of the plurality of zones 108A-108F and the plurality of sections 112A-112F shown in FIGS. 5A-5B, 6A-6B, and 7A-7B. Further, the plurality of sections 804A-804F in the second user interface 106 may include a plurality of display elements 806 (i.e. similar to the plurality of display elements 114 described for example in FIGS. 5A-5B). As described for example in FIGS. 4 and 5B, the plurality of sections 804A-804F may be formed based on the number of groups formed for the number of the plurality of display elements 806. The first user interface 104 may further form same number of the plurality of zones 802A-802F as the number of the plurality of sections 804A-804F formed on the second user interface 106.

In accordance with an embodiment, the first input (i.e. touch or hover input) may be received on one of the plurality of zones 802A-802F, such as on a zone 802D as shown in FIG. 8A. The first user interface 104 may detect the receipt of the first input on the zone 802D and may communicate information about the detected zone 802D to the electronic apparatus 102. The electronic apparatus 102 may further determine the corresponding section (such as section 804D) on the plurality of sections 804A-804F based on the predefined mapping between the plurality of sections 804A-804F and the plurality of zones 802A-802F. The circuitry 204 of the electronic apparatus 102 may further control the second user interface 106 to modify (i.e. enlarge) the corresponding or selected section (such as section 804D) as shown in FIG. 8B. Based on the modification of the selection section (such as section 804D), the second user interface 106 may or may not modify the sizes of the other sections (such as section 804A-804C and 804E-804F). The circuitry 204 may further control the first user interface 104 to modify (i.e. enlarge as shown in FIG. 8B) the input area of the selection zone 802D, similar to as described, for example at FIGS. 5A-5B.

In an embodiment, the circuitry 204 may further control the first user interface 104 to further divide the selected zone (such as zone 802D) into certain number of sub-zones as shown in FIG. 8B (i.e. similar to the plurality of sub-zones 104A in FIGS. 1, 5B, 6B, and 7B). The circuitry 204 may determine the number of sub-zones based on the number of display elements present in the selected section (for example the section 804D). For example, as shown in FIG. 8B, the number of display elements (i.e. user selectable elements) on the selected section is three, therefore the number of sub-zones of the selected zone 802B may also be three.

Figure 9A:
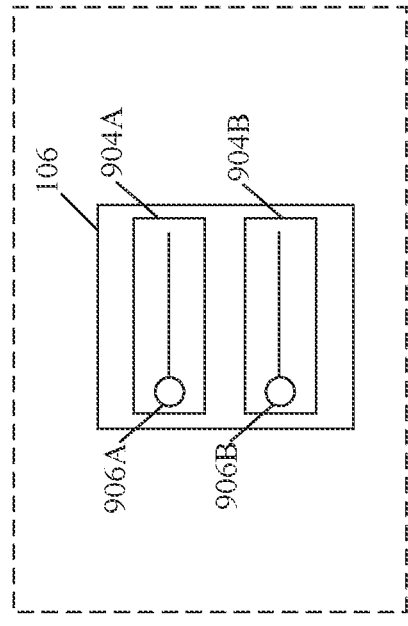
Figure 9B:
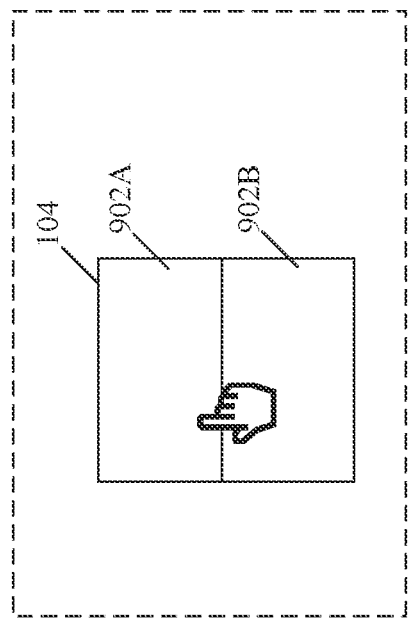
Figure 9B:
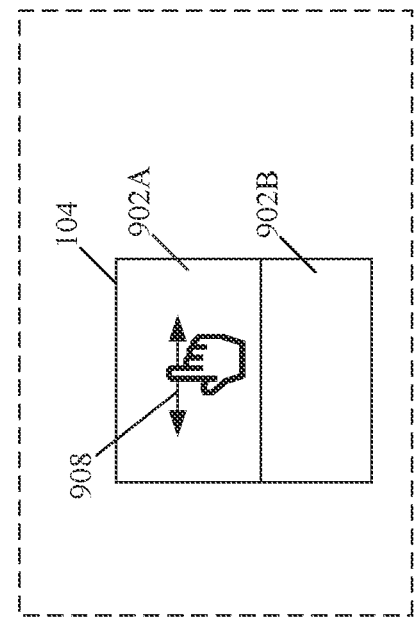

With reference to FIGS. 9A-9B, there is shown the first user interface 104 to control the second user interface 106. The first user interface 104 (for example touchpad) may include a plurality of zones 902A-902B and the second user interface 106 (for example display screen) may include a plurality of sections 904A-904B. Further, the plurality of sections 904A-904B in the second user interface 106 may include a plurality of display elements 906A-906B (i.e. similar to the plurality of display elements 114 described for example in FIGS. 5A-5B). In an example, the plurality of display elements 906A-906B may be a user interactable element, such as a slider as shown in FIGS. 9A-9B.

In accordance with an embodiment, the first input (i.e. touch or hover input) may be received on one of the plurality of zones 902A-902B, such as on a zone 902A as shown in FIG. 9A. The first user interface 104 may detect the receipt of the first input on the zone 902A and may communicate information about the detected zone 902A to the electronic apparatus 102. The electronic apparatus 102 may further determine the corresponding section (such as section 904A) on the plurality of sections 904A-904B based on the predefined mapping between the plurality of sections 904A-

904B and the plurality of zones 902A-902B. The circuitry 204 of the electronic apparatus 102 may further control the second user interface 106 to modify (i.e. enlarge) the corresponding or selected section (such as section 904A) as shown in FIG. 9B. Based on the modification of the selection section (such as section 904A), the second user interface 106 may or may not modify the sizes of the other sections (such as section 904B). The circuitry 204 may further control the first user interface 104 to modify (i.e. enlarge) the input area of the selection zone 902A, similar to as described, for example at FIGS. 5A-5B. The user 118 may further control the display element 906A (i.e. slider) based on the touch or hover movement of the finger of the user 118 on the selected zone 902 in a horizontal direction 908, as shown in FIG. 9B.

Figure 10A:
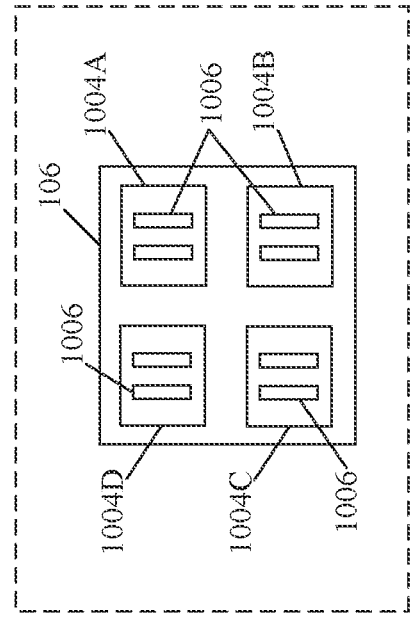
Figure 10A:
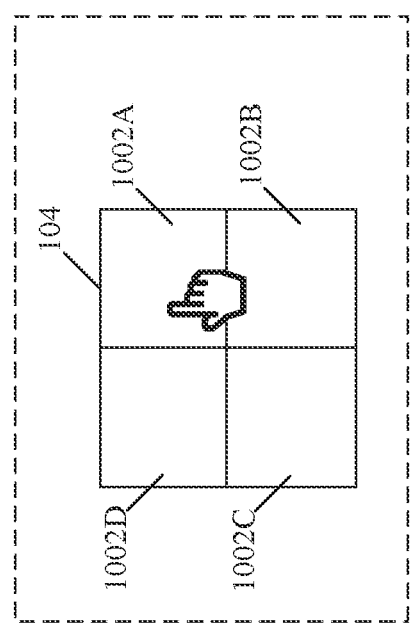
Figure 10B:
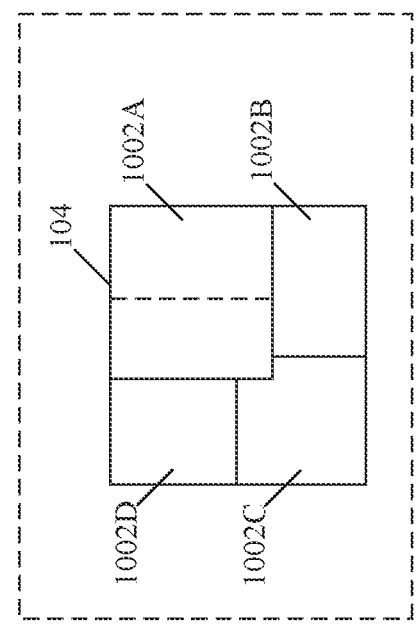

With reference to FIGS. 10A-10B, there is shown the first user interface 104 and the second user interface 106 in another exemplary shape or structure. The first user interface 104 (for example touchpad) may include a plurality of zones 1002A-1002D and the second user interface 106 (for example display screen) may include a plurality of sections 1004A-1004D. Further, the plurality of sections 1004A-1004D in the second user interface 106 may include a plurality of display elements 1006 (i.e. similar to the plurality of display elements 114 described for example in FIGS. 5A-5B).

In accordance with an embodiment, the first input (i.e. touch or hover input) may be received on one of the plurality of zones 1002A-1002D, such as on a zone 1002A as shown in FIG. 10A. The first user interface 104 may detect the receipt of the first input on the zone 1002A and may communicate information about the detected zone 1002A to the electronic apparatus 102. The electronic apparatus 102 may further determine the corresponding section (such as section 1004A) on the plurality of sections 1004A-1004D based on the predefined mapping between the plurality of sections 1004A-1004D and the plurality of zones 1002A-1002D. The circuitry 204 of the electronic apparatus 102 may further control the second user interface 106 to modify (i.e. enlarge) the corresponding or selected section (such as section 1004A) as shown in FIG. 10B. Based on the modification of the selection section (such as section 1004A), the second user interface 106 may or may not modify the sizes of the other sections (such as sections 1004B-100D). In an embodiment, the circuitry 204 may control the second user interface 106 to modify (i.e. enlarge the size or change the display characteristics) of a particular display element of the selection section 1004A, as shown for example in FIG. 10B. The circuitry 204 may further control the first user interface 104 to modify (i.e. enlarge as shown in FIG. 10B) the input area of the selection zone 1002A, similar to as described, for example at FIGS. 5A-5B.

In an embodiment, the circuitry 204 may further control the first user interface 104 to further divide the selected zone (such as zone 1002A) into certain number of sub-zones as shown in FIG. 10B (i.e. similar to the plurality of sub-zones 104A in FIGS. 1, 5B, 6B, and 7B). The circuitry 204 may determine the number of sub-zones based on the number of display elements present in the selected section (for example the section 1004A). For example, as shown in FIG. 10B, the number of display elements (i.e. user selectable elements) on the selected section of the second user interface 106 is two, therefore the number of sub-zones of the selected zone 1002A of the first user interface 104 may also be two.

Figure 10C:
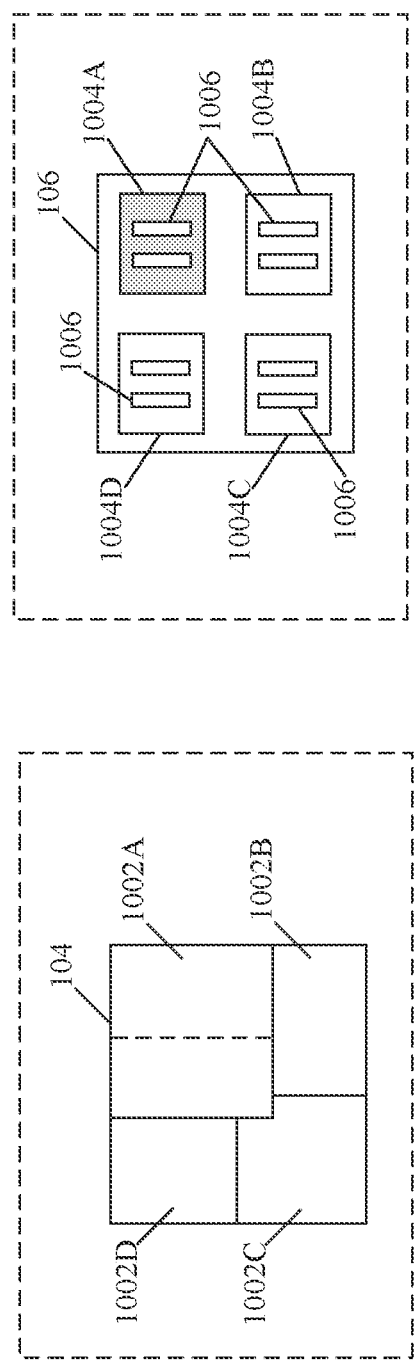

In an alternate embodiment, as shown in FIG. 10C, the circuitry 204 may control the second user interface 106 to change the display characteristics (for example, background color, outline, brightness, contrast, highlighting, font style, or animation) of the selected section (for example the section 1004A), rather than modification (i.e. enlargement) of the size of the selected section (for example the section 1004A). Such change in the display characteristics may further improve visual appearance of the selected section (for example the section 1004A) for the user 118 and further, it may be easier for the user 118 to view the selected section (for example the section 1004A) from the plurality of sections 1004A-1004D on the second user interface 106.

Figure 11:
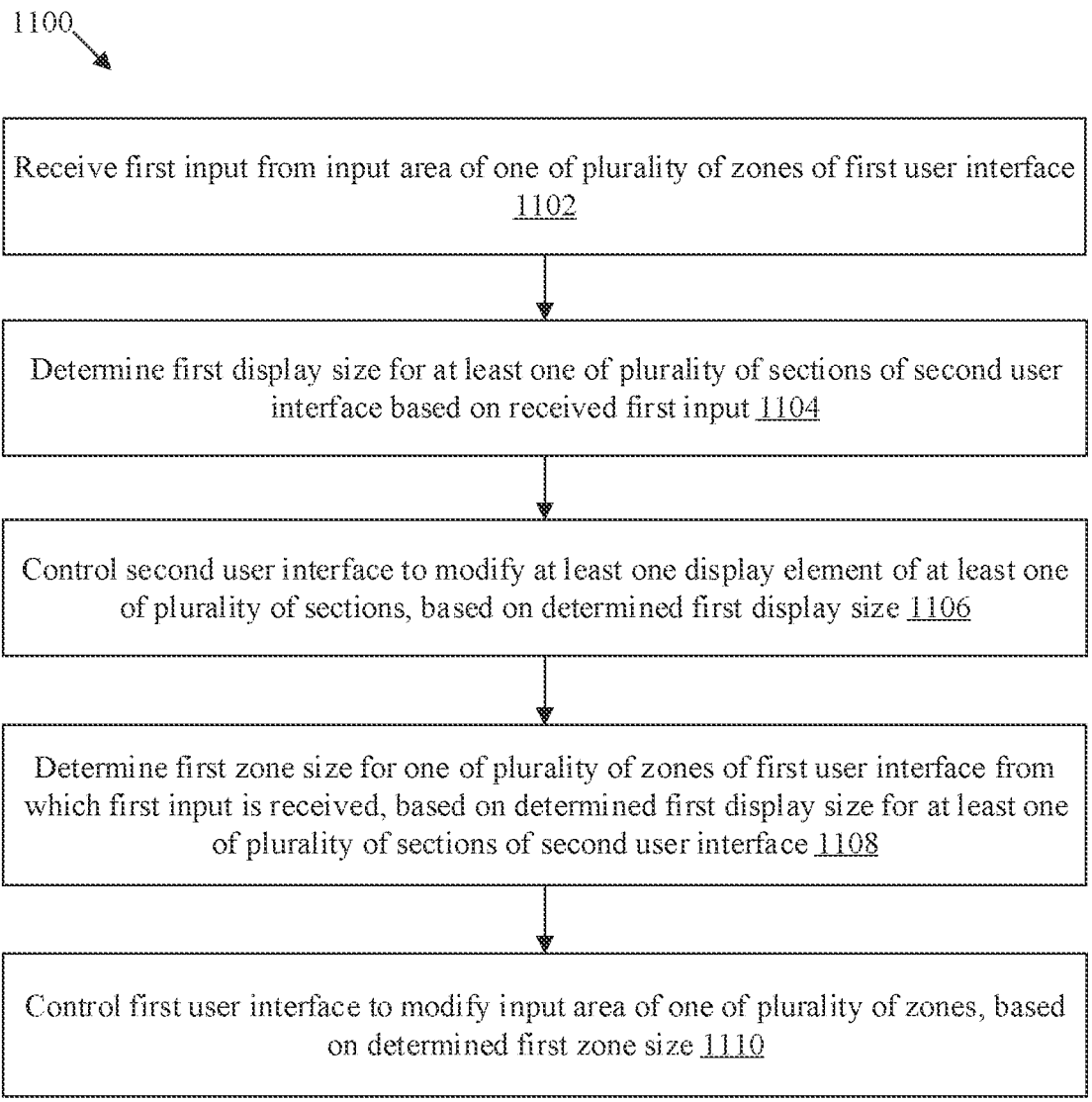
FIG. 11 is a flowchart that illustrates exemplary operations for display control based on touch interface, in accordance with an embodiment of the disclosure.

FIG. 11 is a flowchart that illustrates exemplary operations for display control based on touch interface, in accordance with an embodiment of the disclosure. FIG. 8 is explained in conjunction with elements from FIG. 1, FIG. 2, FIG. 3, FIG. 4, FIGS. 5A-5B, FIGS. 6A-6B, FIGS. 7A-7B, 8A-8B, 9A-9B, and 10A-10B. With reference to FIG. 8, there is shown a flowchart 1100. The operations from 1102 to 1110 may be implemented, for example, by the electronic apparatus 102, or the circuitry 204 of FIG. 2. The operations of the flowchart 1100 may start at 1102.

At 1102, the first input may be received. In an embodiment, the circuitry 204 of the electronic apparatus 102 may be configured to receive the first input from the input area (such as input area 110B) of one of the plurality of zones 108A-108F (such as zone 108B) of the first user interface 104, as described, for example, in FIGS. 4, and 5A.

At 1104, the first display size for at least one of the plurality of sections 112A-112F may be determined. In an embodiment, the circuitry 204 of the electronic apparatus 102 may be configured to determine the first display size for at least one (i.e. section 112B) of the plurality of sections 112A-112F of the second user interface 106 based on the received first input, as described, for example, in FIG. 5A.

At 1106, at least one display element of at least one of the plurality of sections 112A-112F may be modified. In an embodiment, the circuitry 204 of the electronic apparatus 102 may control the second user interface 106 to modify at least one display element of at least one of the plurality of sections 112A-112F, based on the determined first display size, as described, for example, in FIG. 5A.

At 1108, the first zone size may be determined. In an embodiment, the circuitry 204 of the electronic apparatus 102 may be configured to determine the first zone size for one (i.e. zone 108B) of the plurality of zones 108A-108F of the first user interface 104 from which the first input is received. The first zone size may be determined based on the determined first display size for at least one (i.e. section 112B) of the plurality of sections 112A-112F of the second user interface 106, as described, for example, in FIG. 5A. In accordance with an embodiment, the circuitry 204 of the electronic apparatus 102 may execute steps 1106 and 1108 concurrently. In another embodiment, the circuitry 204 may execute step 1108 prior to step 1106.

At 1110, the input area of the one of the plurality of zones 108A-108F may be modified. In an embodiment, the circuitry 204 of the electronic apparatus 102 may be configured to control the first user interface 104 to modify the input area of the one (i.e. zone 108B) of the plurality of zones 108A-108F, based on the determined first zone size, as described for example, in FIGS. 5A-5B. The control may pass to end.

Although the flowchart 1100 is illustrated as discrete operations, such as 1102, 1104, 1106, 1108, and 1110, the disclosure is not so limited. Accordingly, in certain embodiments, such discrete operations may be further divided into additional operations, combined into fewer operations, or eliminated, depending on the particular implementation without deviating from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the electronic apparatus 102) for display control of the second user interface 106 via the first user interface 104. The set of instructions may be executable by the machine and/or the computer (for example the electronic apparatus 102) to perform operations that may include reception of a first input from an input area of one of the plurality of zones of the first user interface. The operations may further include determination of a first display size for at least one of the plurality of sections of the second user interface based on the received first input. At least one of the plurality of sections may correspond to the one of the plurality of zones of the first user interface from which the first input is received. The operations may further include control of the second user interface to modify at least one display element of at least one of the plurality of sections, based on the determined first display size. The operation may further include determination of a first zone size for the one of the plurality of zones of the first user interface from which the first input is received, based on the determined first display size for at least one of the plurality of sections of the second user interface. The operations may further include control of the first user interface to modify the input area of the one of the plurality of zones, based on the determined first zone size.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
circuitry communicably coupled with a first user interface and a second user interface,
wherein the first user interface includes a plurality of zones having a plurality of input areas to receive user inputs, wherein the second user interface includes a plurality of sections to display a plurality of display elements,
wherein the first user interface comprises a touch pad and the second user interface comprises a display screen, and wherein the first user interface is different from the second user interface,
the circuitry is configured to:
receive a first input from an input area of one of the plurality of zones of the first user interface;
determine a first display size for at least one of the plurality of sections of the second user interface based on the received first input, wherein the at least one of the plurality of sections corresponds to the one of the plurality of zones of the first user interface from which the first input is received;
control the second user interface to modify at least one display element of the at least one of the plurality of sections, based on the determined first display size;
determine a first zone size for the one of the plurality of zones of the first user interface from which the first input is received, based on the determined first display size for the at least one of the plurality of sections of the second user interface; and
control the first user interface to modify the input area of the one of the plurality of zones, based on the determined first zone size.

2. The electronic apparatus according to claim 1, wherein the circuitry is further configured to determine the first display size based on at least one of: a number of the plurality of display elements displayed on the second user interface, a size of the second user interface, a geometric shape of the second user interface, an aspect ratio of the second user interface, or a resolution of the second user interface.

3. The electronic apparatus according to claim 1, wherein the circuitry is further configured to:
control the second user interface to enlarge a first graphic size of the plurality of display elements associated with the at least one of the plurality of sections, based on the determined first display size; and
control the second user interface to modify the plurality of display elements associated with others of the plurality of sections, based on the determined first display size.

4. The electronic apparatus according to claim 3, wherein the circuitry is further configured to:
control the second user interface to enlarge the first graphic size of the plurality of display elements associated with the at least one of the plurality of sections, in at least one of: a horizontal space or a vertical space, based on the determined first display size.

5. The electronic apparatus according to claim 3, based on the determined first display size, wherein the circuitry is further configured to:
control the second user interface to reduce a second graphic size of the plurality of display elements associated with the others of the plurality of sections; and
control the second user interface to move the plurality of display elements associated with the others of the plurality of sections.

6. The electronic apparatus according to claim 1, wherein the circuitry is further configured to:
control the second user interface to enlarge a first graphic size of the at least one display element associated with the at least one of the plurality of sections, based on the determined first display size; and
control the second user interface to modify the at least one display element associated with others of the plurality of sections, based on the determined first display size.

7. The electronic apparatus according to claim 1, wherein the circuitry is further configured to:
control the second user interface to change a display characteristics of the at least one display element of the at least one of the plurality of sections based on the received first input,
wherein the display characteristics includes at least one of: color, brightness, contrast, highlighting, font style, font size, graphic size, or animation.

8. The electronic apparatus according to claim 6, based on the determined first display size, wherein the circuitry is further configured to:
control the second user interface to reduce a second graphic size of the at least one display element associated with the others of the plurality of sections; and
control the second user interface to move the at least one display element associated with the others of the plurality of sections.

9. The electronic apparatus according to claim 1, wherein the circuitry is further configured to determine the first zone size based on at least one of: a surface area of the first user interface, an aspect ratio of the first user interface, a geometric shape of the first user interface, or a number of the plurality of zones in the first user interface.

10. The electronic apparatus according to claim 1, wherein the circuitry is further configured to:
control the first user interface to enlarge the input area of the one of the plurality of zones, based on the determined first zone size; and
control the first user interface to modify the plurality of input areas associated with others of the plurality of zones based on the determined first zone size.

11. The electronic apparatus according to claim 10, wherein based on the determined first zone size, the circuitry is further configured to:
control the first user interface to reduce the plurality of input areas associated with the others of the plurality of zones; and
control the first user interface to move the plurality of input areas associated with the others of the plurality of zones.

12. The electronic apparatus according to claim 1, further comprising a memory, wherein the circuitry is further configured to:
receive a second input from the input area of the one of the plurality of zones of the first user interface, wherein the second input corresponds to a selection of the at least one display element of the at least one of the plurality of sections of the second user interface;
retrieve, from the memory, control instructions associated with the selected at least one display element; and
execute the retrieved control instructions associated with the at least one display element.

13. The electronic apparatus according to claim 1, wherein a first aspect ratio of the first user interface is different from a second aspect ratio of the second user interface.

14. The electronic apparatus according to claim 1, wherein a first aspect ratio of the first user interface is same as second aspect ratio of the second user interface.

15. The electronic apparatus according to claim 1, wherein the plurality of display elements corresponds to at least one of: a textual character, a graphical icon, or an image.

16. The electronic apparatus according to claim 1, wherein,
a number of the plurality of sections of the second user interface is based on a number of the plurality of display elements displayed on the second user interface and a display layout of the plurality of display elements; and
a number of the plurality of zones of the first user interface is same as the number of the plurality of sections of the second user interface.

17. A method, comprising:
in an electronic apparatus coupled with a first user interface and a second user interface,
wherein the first user interface comprises a touch pad and the second user interface comprises a display screen, wherein the first user interface is different from the second user interface, and
wherein the first user interface includes a plurality of zones having a plurality of input areas to receive user inputs, and wherein the second user interface includes a plurality of sections to display a plurality of display elements:
receiving a first input from an input area of one of the plurality of zones of the first user interface;
determining a first display size for at least one of the plurality of sections of the second user interface based on the received first input, wherein the at least one of the plurality of sections corresponds to the one of the plurality of zones of the first user interface from which the first input is received;
controlling the second user interface to modify at least one display element of the at least one of the plurality of sections, based on the determined first display size;
determining a first zone size for the one of the plurality of zones of the first user interface from which the first input is received, based on the determined first display size for the at least one of the plurality of sections of the second user interface; and
controlling the first user interface to modify the input area of the one of the plurality of zones, based on the determined first zone size.

18. A circuitry for being communicably coupled with a first user interface that includes a plurality of zones having a plurality of input areas to receive user inputs and communicably coupled with a second user interface that includes a plurality of sections to display a plurality of display elements,
wherein the first user interface comprises a touch pad and the second user interface comprises a display screen, and wherein the first user interface is different from the second user interface,
the circuitry configured to:
receive a first input from an input area of one of the plurality of zones of the first user interface;
determine a first display size for at least one of the plurality of sections of the second user interface based on the received first input, wherein the at least one of the plurality of sections corresponds to the one of the plurality of zones of the first user interface from which the first input is received;

control the second user interface to modify at least one display element of the at least one of the plurality of sections, based on the determined first display size;

determine a first zone size for the one of the plurality of zones of the first user interface from which the first input is received, based on the determined first display size for the at least one of the plurality of sections of the second user interface; and control the first user interface to modify the input area of the one of the plurality of zones, based on the determined first zone size.

19. A non-transitory computer-readable medium having stored thereon, computer-executable instructions which, when executed by an electronic apparatus, cause the electronic apparatus to execute operations, the operations comprising:

controlling a first user interface including a plurality of zones having a plurality of input areas to receive user inputs;

controlling a second user interface including a plurality of sections to display a plurality of display elements;

wherein the first user interface comprises a touch pad and the second user interface comprises a display screen, and wherein the first user interface is different from the second user interface;

receiving a first input from an input area of one of the plurality of zones of the first user interface;

determining a first display size for at least one of the plurality of sections of the second user interface based on the received first input, wherein the at least one of the plurality of sections corresponds to the one of the plurality of zones of the first user interface from which the first input is received;

controlling the second user interface to modify at least one display element of the at least one of the plurality of sections, based on the determined first display size;

determining a first zone size for the one of the plurality of zones of the first user interface from which the first input is received, based on the determined first display size for the at least one of the plurality of sections of the second user interface; and controlling the first user interface to modify the input area of the one of the plurality of zones, based on the determined first zone size.

\* \* \* \* \*